(12) United States Patent
Doshi et al.

(10) Patent No.: US 7,916,690 B2
(45) Date of Patent: *Mar. 29, 2011

(54) GRAPHICAL DISPLAY OF STATUS INFORMATION IN A WIRELESS NETWORK MANAGEMENT SYSTEM

(75) Inventors: Bhautik Doshi, Fremont, CA (US); Madhavi Vulpala, Fremont, CA (US); Jyoti Jain, Sunnyvale, CA (US); Roy Nobuo Nakashima, San Jose, CA (US)

(73) Assignee: Cisco Systems, Inc., San Jose, CA (US)

(*) Notice: Subject to any disclaimer, the term of this patent is extended or adjusted under 35 U.S.C. 154(b) by 188 days.

This patent is subject to a terminal disclaimer.

(21) Appl. No.: 12/269,423

(22) Filed: Nov. 12, 2008

(65) Prior Publication Data
US 2009/0092113 A1 Apr. 9, 2009

Related U.S. Application Data

(63) Continuation of application No. 10/982,390, filed on Nov. 5, 2004, now Pat. No. 7,457,262.

(51) Int. Cl.
*H04W 4/00* (2009.01)
(52) U.S. Cl. ......... 370/328; 370/338; 455/446; 455/566
(58) Field of Classification Search .................. 370/328, 370/338; 455/446, 566
See application file for complete search history.

(56) References Cited

U.S. PATENT DOCUMENTS

| | | |
|---|---|---|
| 5,491,692 A | 2/1996 | Gunner et al. |
| 5,684,860 A | 11/1997 | Milani et al. |
| 6,208,629 B1 | 3/2001 | Jaszewski et al. |
| 6,286,038 B1 | 9/2001 | Reichmeyer et al. |
| 6,760,318 B1 | 7/2004 | Bims |
| 6,788,658 B1 | 9/2004 | Bims |
| 6,917,819 B2 | 7/2005 | Collins |
| 6,925,070 B2 | 8/2005 | Proctor, Jr. |
| 7,031,280 B2 | 4/2006 | Segal |
| 7,106,271 B1 | 9/2006 | Friday et al. |
| 7,116,988 B2 | 10/2006 | Dietrich et al. |
| 7,212,837 B1 | 5/2007 | Calhoun et al. |
| 7,301,926 B1 | 11/2007 | Dietrich et al. |
| 7,302,256 B1 | 11/2007 | O'Hara et al. |
| 7,340,247 B1 | 3/2008 | O'Hara et al. |
| 7,346,338 B1 | 3/2008 | Calhoun et al. |
| 7,433,696 B2 | 10/2008 | Dietrich et al. |

(Continued)

OTHER PUBLICATIONS

USPTO Communication for Calhoun, et al., for U.S. Appl. No. 11/679,762 dated May 17, 2010, 17 pages.

(Continued)

*Primary Examiner* — Barry W Taylor
(74) *Attorney, Agent, or Firm* — Baker Botts L.L.P.

(57) ABSTRACT

Methods, apparatuses and systems directed to, or facilitating, the graphical display of status information in wireless network management systems. In one implementation, the present invention provides a graphical user interface that allows a network administrator to readily ascertain the overall status of a wireless network, and quickly identify the network element(s) within the network that are associated with any potential problem or condition. In another implementation, the present invention provides a graphical user interface that provides status icons that efficiently convey status information for corresponding access points. In another implementation, the present invention provides a hierarchical network model that facilitates network data management, configuration and display tasks associated with wireless network management systems.

23 Claims, 20 Drawing Sheets

U.S. PATENT DOCUMENTS

| | | | |
|---|---|---|---|
| 7,457,262 | B1 | 11/2008 | Doshi et al. |
| 7,508,801 | B1 | 3/2009 | Calhoun et al. |
| 2002/0006130 | A1 | 1/2002 | Tai et al. |
| 2002/0110105 | A1 | 8/2002 | Awater |
| 2002/0188723 | A1 | 12/2002 | Choi |
| 2002/0194384 | A1 | 12/2002 | Habetha |
| 2003/0023746 | A1 | 1/2003 | Loguinov |
| 2003/0152037 | A1 | 8/2003 | Howard ............ 370/252 |
| 2003/0188006 | A1 | 10/2003 | Bard |
| 2003/0198208 | A1 | 10/2003 | Koos, Jr. et al. |
| 2003/0224787 | A1 | 12/2003 | Gandolfo |
| 2004/0111607 | A1 | 6/2004 | Yellepeddy |
| 2005/0003827 | A1* | 1/2005 | Whelan ............ 455/454 |
| 2005/0260996 | A1 | 11/2005 | Groenendaal ......... 455/445 |
| 2006/0073832 | A1* | 4/2006 | Pfister ............ 455/446 |
| 2007/0140202 | A1 | 6/2007 | Calhoun |
| 2008/0285530 | A1 | 11/2008 | Dietrich et al. |
| 2009/0158042 | A1 | 6/2009 | Calhoun et al. |

OTHER PUBLICATIONS

USPTO Communication for Calhoun, et al., for U.S. Appl. No. 11/679,762 dated Nov. 10, 2009, 14 pages.

International Standard, ISO/IEC 8802-11 ANSI/IEEE Std. 802.11, 1999 Edition, Part II: Wireless LAN Medium Access Control (MAC) and Physical Layer (PHY) Specifications, pp. 122-137, 1999.

"tcp-masq" Internet citation http://speed.cis.nctu.edu.tw/bandwith/opensource/, Data Sheet Cisco Aironet 1200 Series Access Point, pp. 1-13, posted Mar. 11, 2002.

2005800130930, State Intellectual Property Office of the People's Republic of China, "Text of the First Office Action", pp. 1-3.

Patent Application for U.S. Appl. No. 10/155,938, filed May 24, 2002 and entitled "Method and System for Hierarchical Processing of Protocol Information in a Wireless LAN".

* cited by examiner

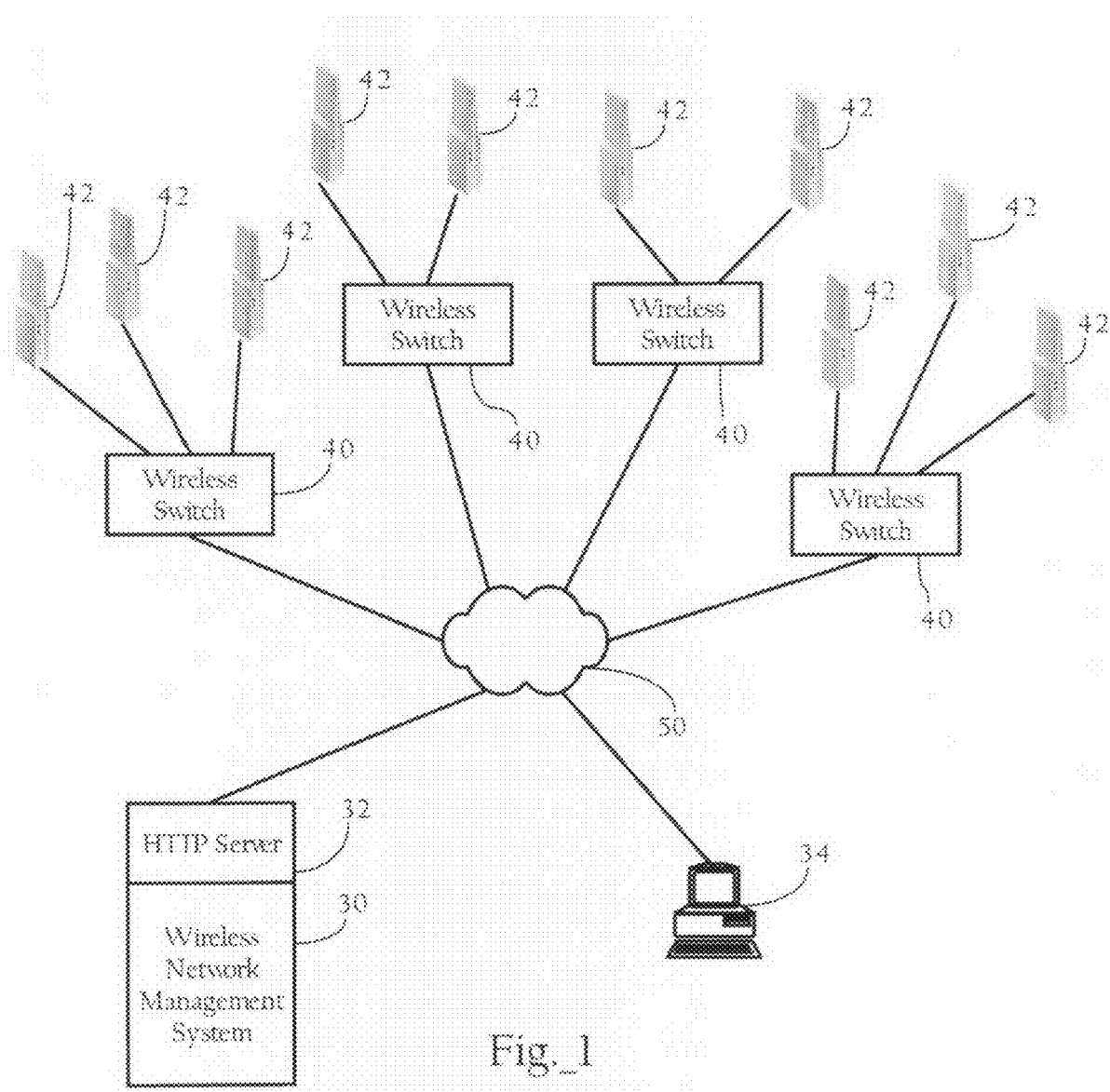
Fig._1

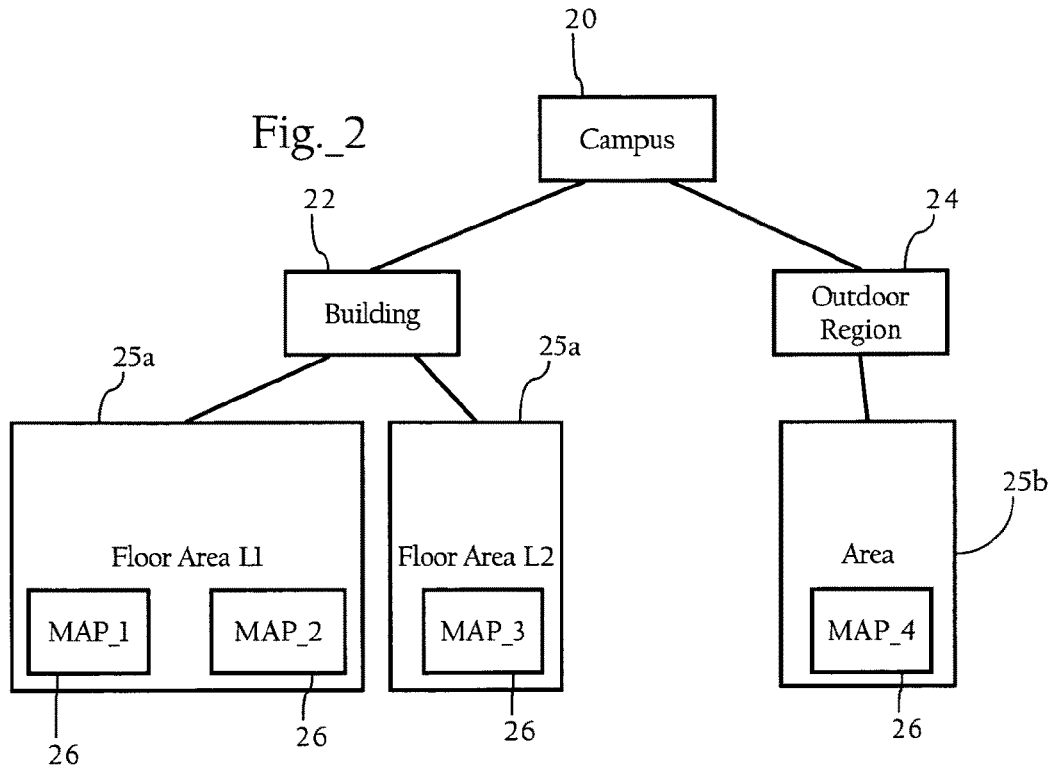
Fig._2
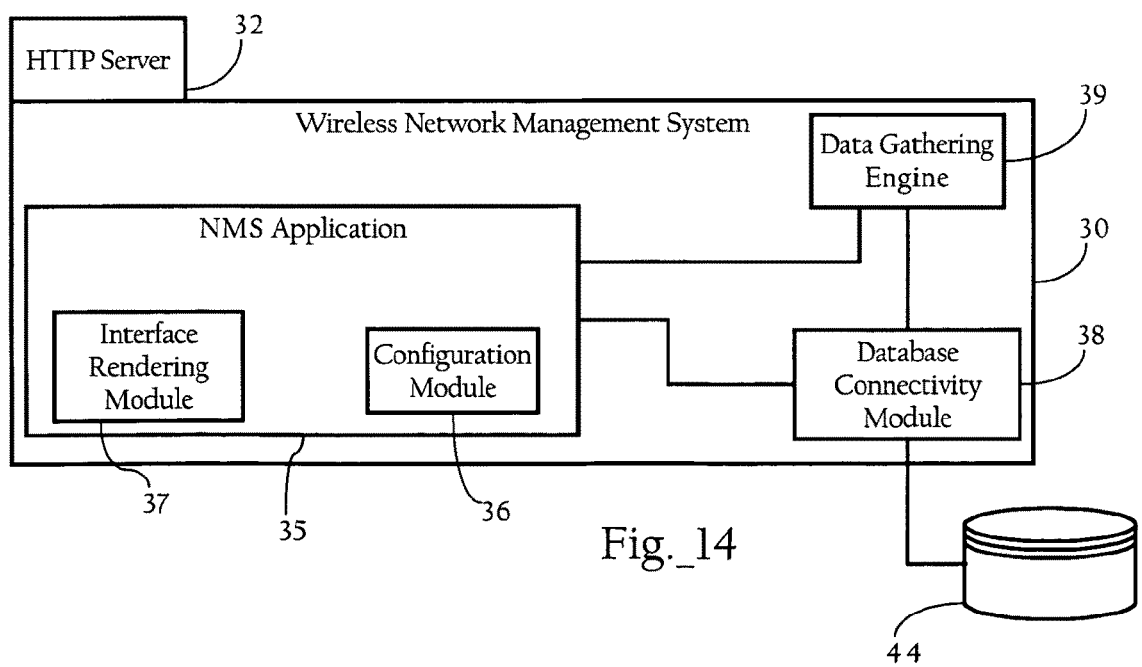
Fig._14

| Column Name | Data Type | Column Size |
|---|---|---|
| NAME | VARCHAR | 256 |
| OWNERNAME | VARCHAR | 256 |
| DOMAINID | INTEGER | 4 |
| DOMAINNAME | VARCHAR | 256 |
| ISROOTDOMAIN | VARCHAR | 10 |
| DOMAINTYPE | INTEGER | 4 |
| UNIT | INTEGER | 4 |
| LENGTH | FLOAT | 8 |
| WIDTH | FLOAT | 8 |
| HEIGHT | FLOAT | 8 |
| XCOORDINATE | FLOAT | 8 |
| YCOORDINATE | FLOAT | 8 |
| ZCOORDINATE | FLOAT | 8 |
| FLOORINDEX | INTEGER | 4 |
| NUMOFBASEMENTS | INTEGER | 4 |
| NUMOFFLOORS | INTEGER | 4 |
| DOMAINCONTACT | VARCHAR | 256 |
| RFMODELID | INTEGER | 4 |
| MONITORSTATUS | INTEGER | 4 |
| IMAGENAME | VARCHAR | 256 |
| WALLFILENAME | VARCHAR | 256 |
| USERENTEREDIMAGENAME | VARCHAR | 256 |
| USERENTEREDWALLFILENAME | VARCHAR | 256 |
| DOT11ACLIENTCOUNT | INTEGER | 4 |
| DOT11BCLIENTCOUNT | INTEGER | 4 |
| DOT11GCLIENTCOUNT | INTEGER | 4 |
| DOT11ARADIOCOUNT | INTEGER | 4 |
| DOT11BRADIOCOUNT | INTEGER | 4 |
| DOT11GRADIOCOUNT | INTEGER | 4 |
| OOSRADIOCOUNT | INTEGER | 4 |
| APCOUNT | INTEGER | 4 |

Fig. 7

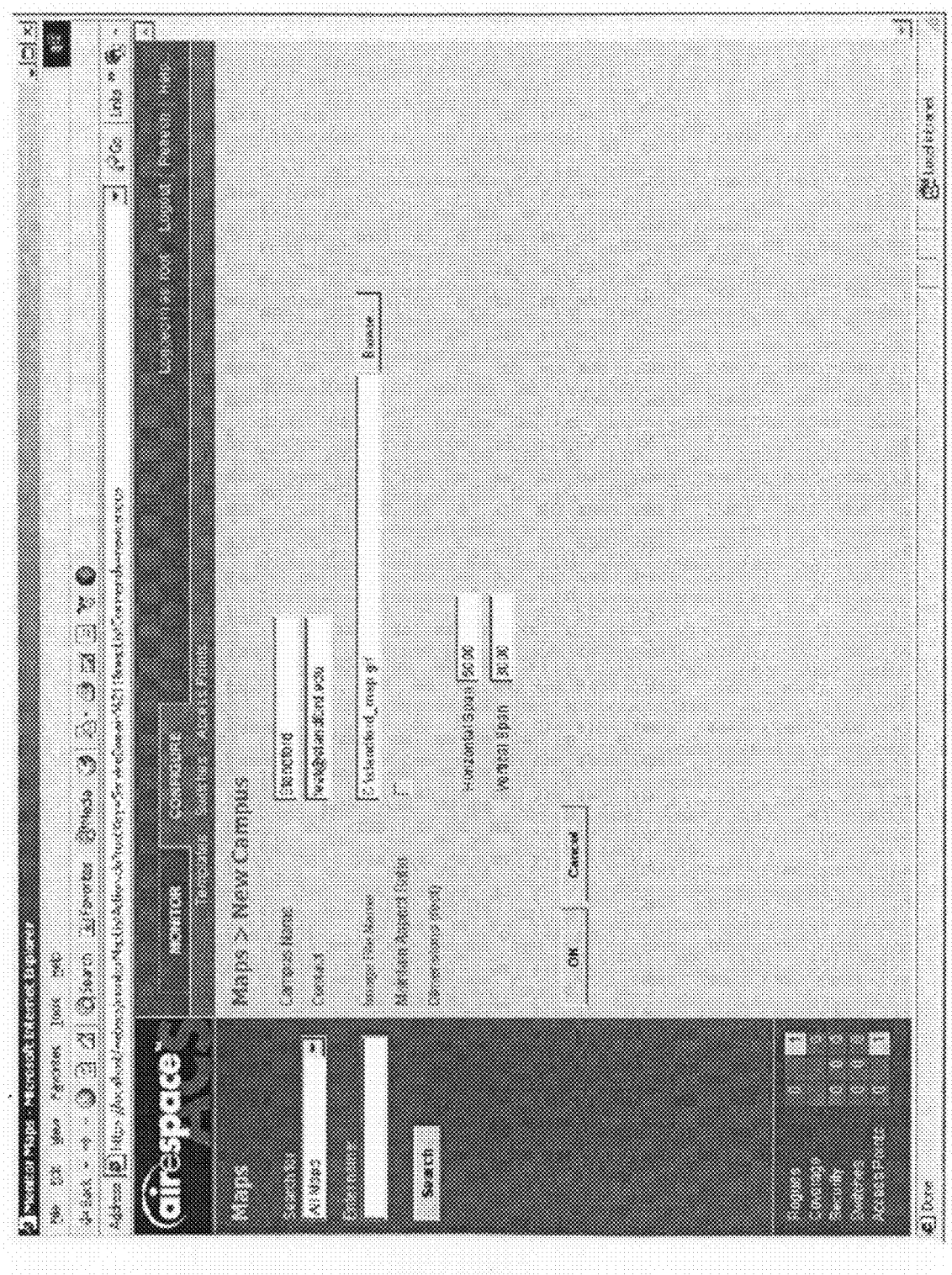
Fig._8

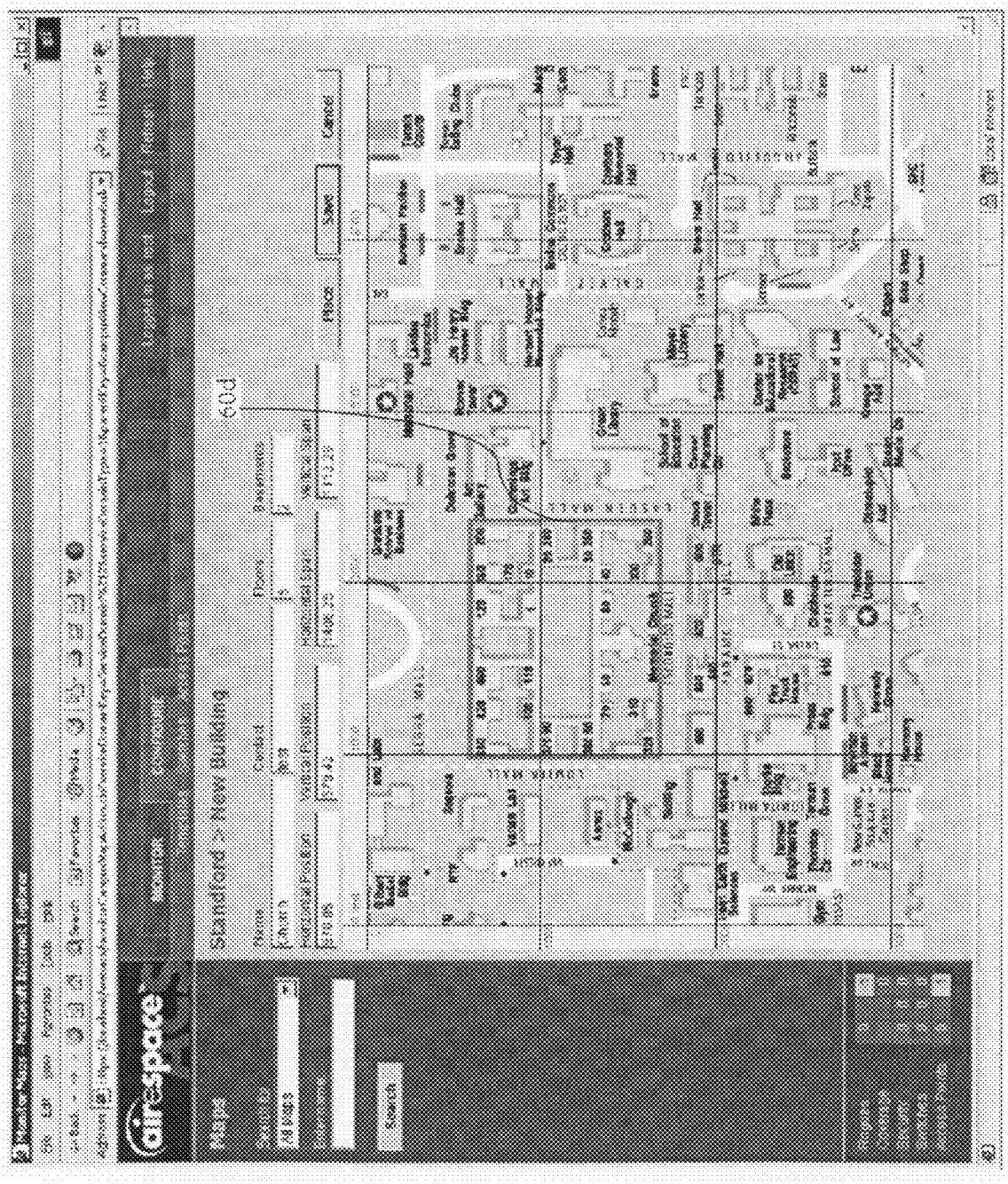
Fig._9

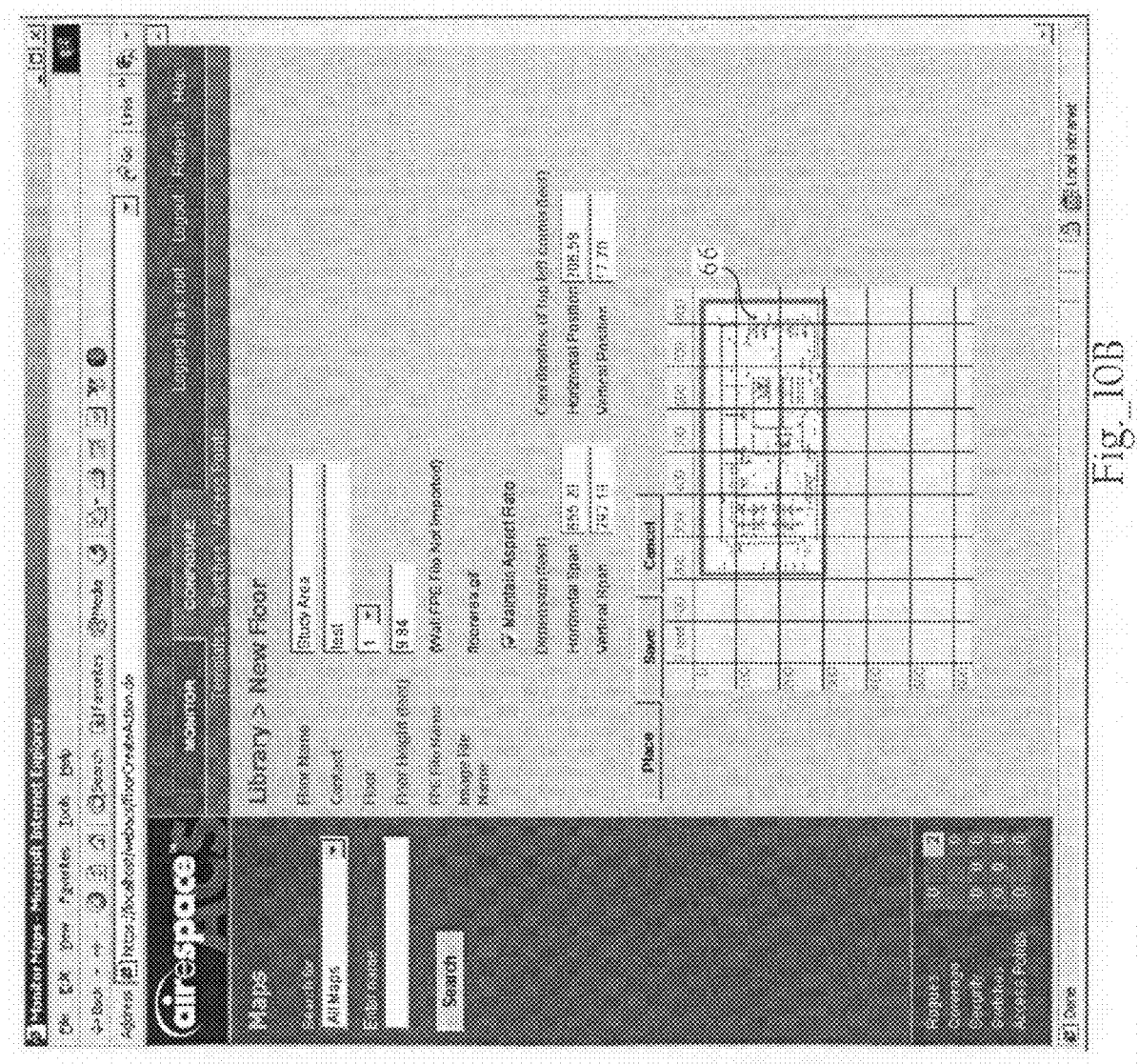

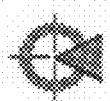
Fig._11a
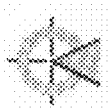
Fig._11b
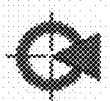
Fig._11c
Fig._11d
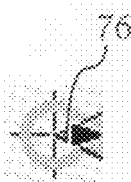
Fig._11e
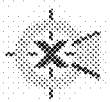
Fig._11f
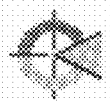
Fig._11g
Fig._11h
Fig._11i
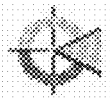
Fig._11j
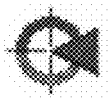
Fig._11k
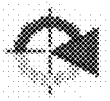
Fig._11m
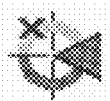
Fig._11n
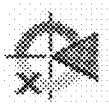
Fig._11o
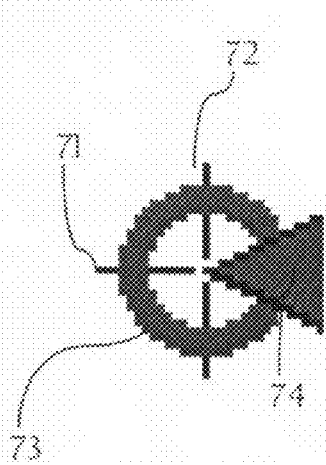
Fig._11p
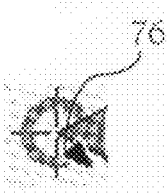
Fig._11q
Fig._11r

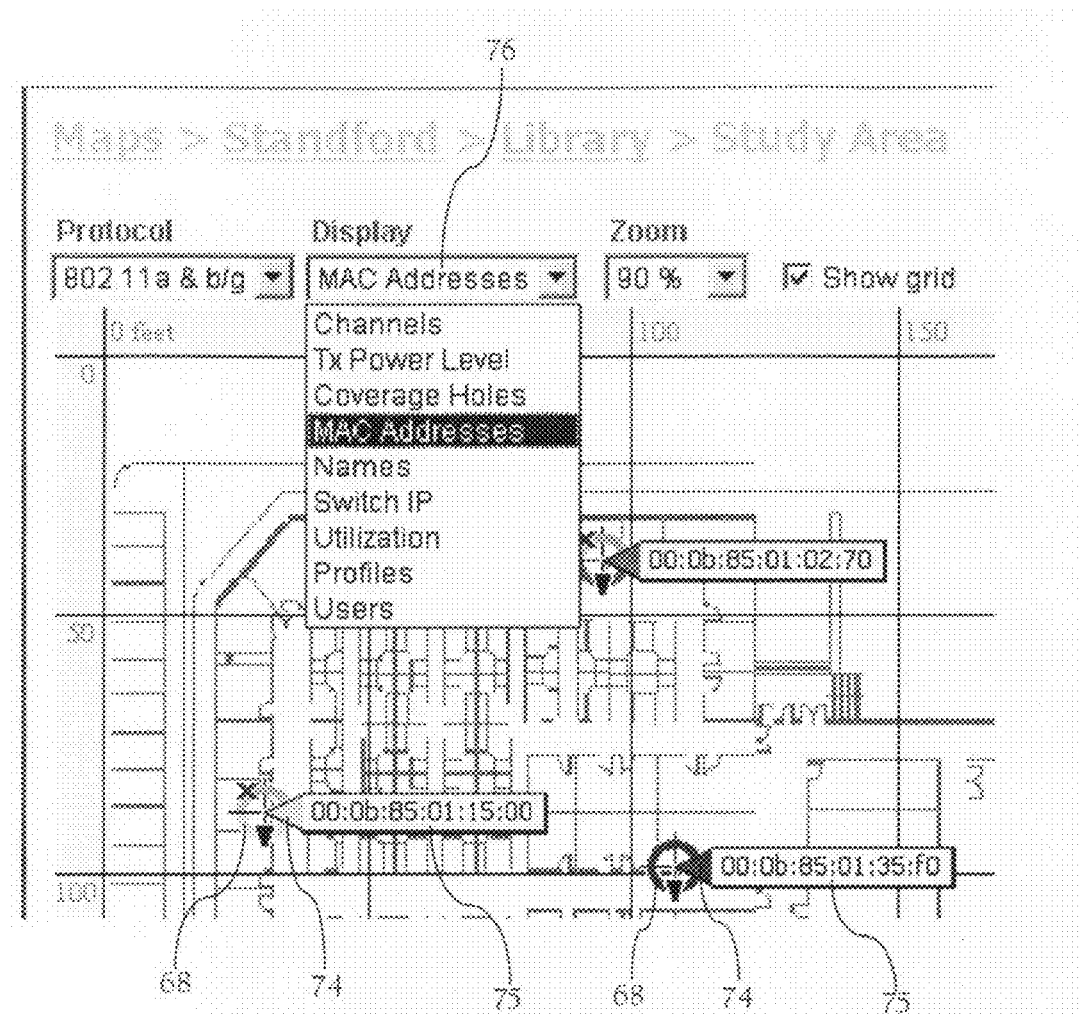
Fig._12a
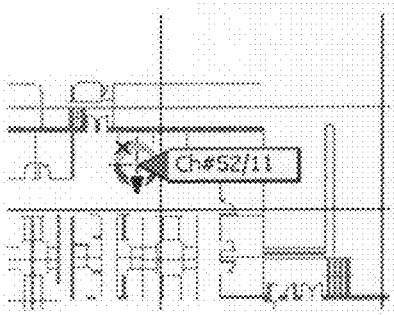
Fig._12b
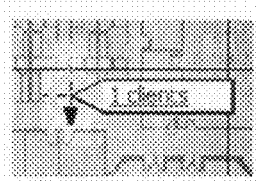
Fig._12c
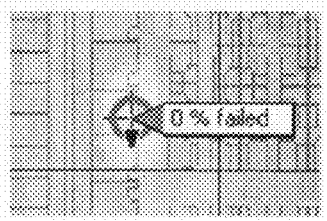
Fig._12d

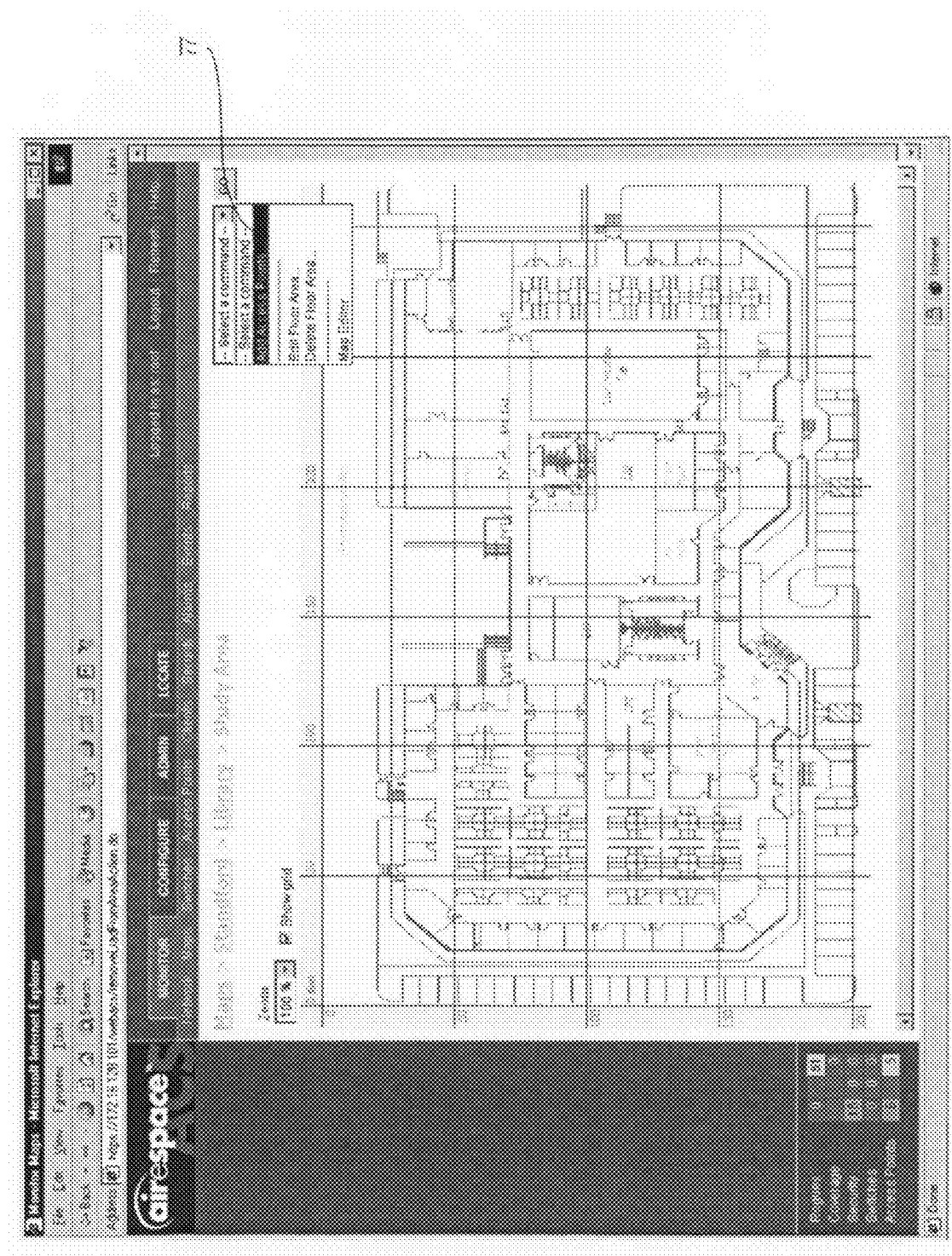
Fig._15

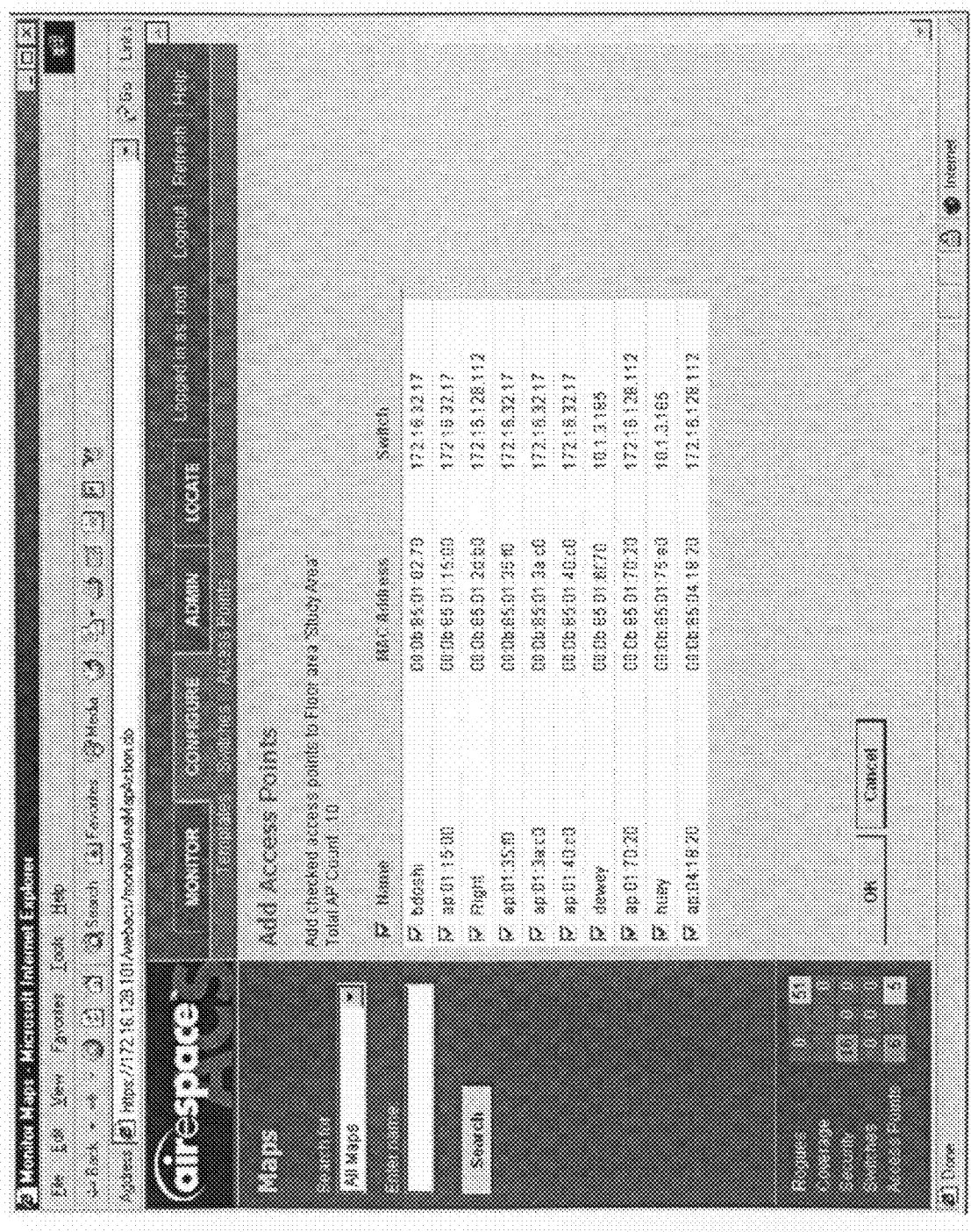
Fig_16

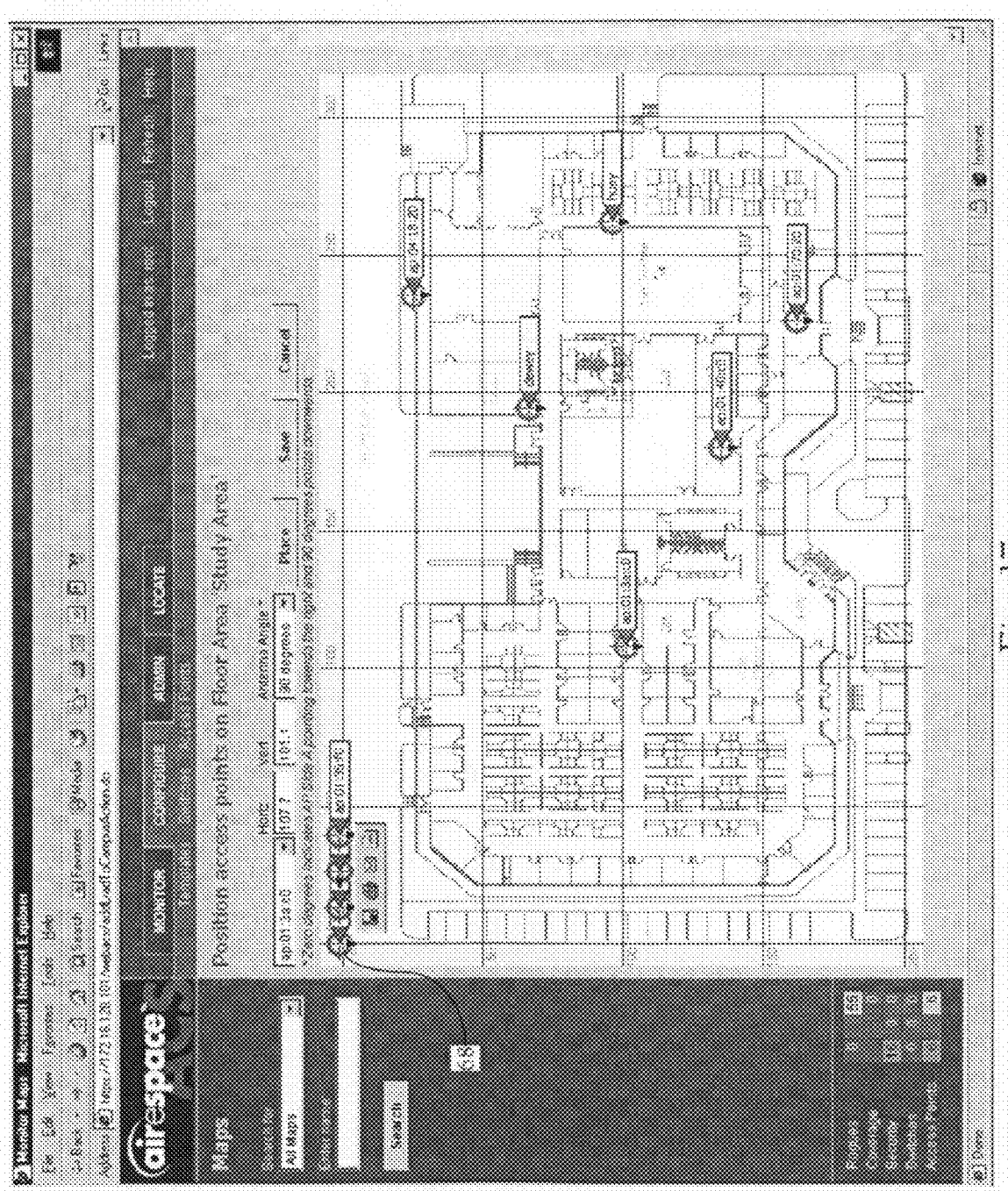
Fig_17

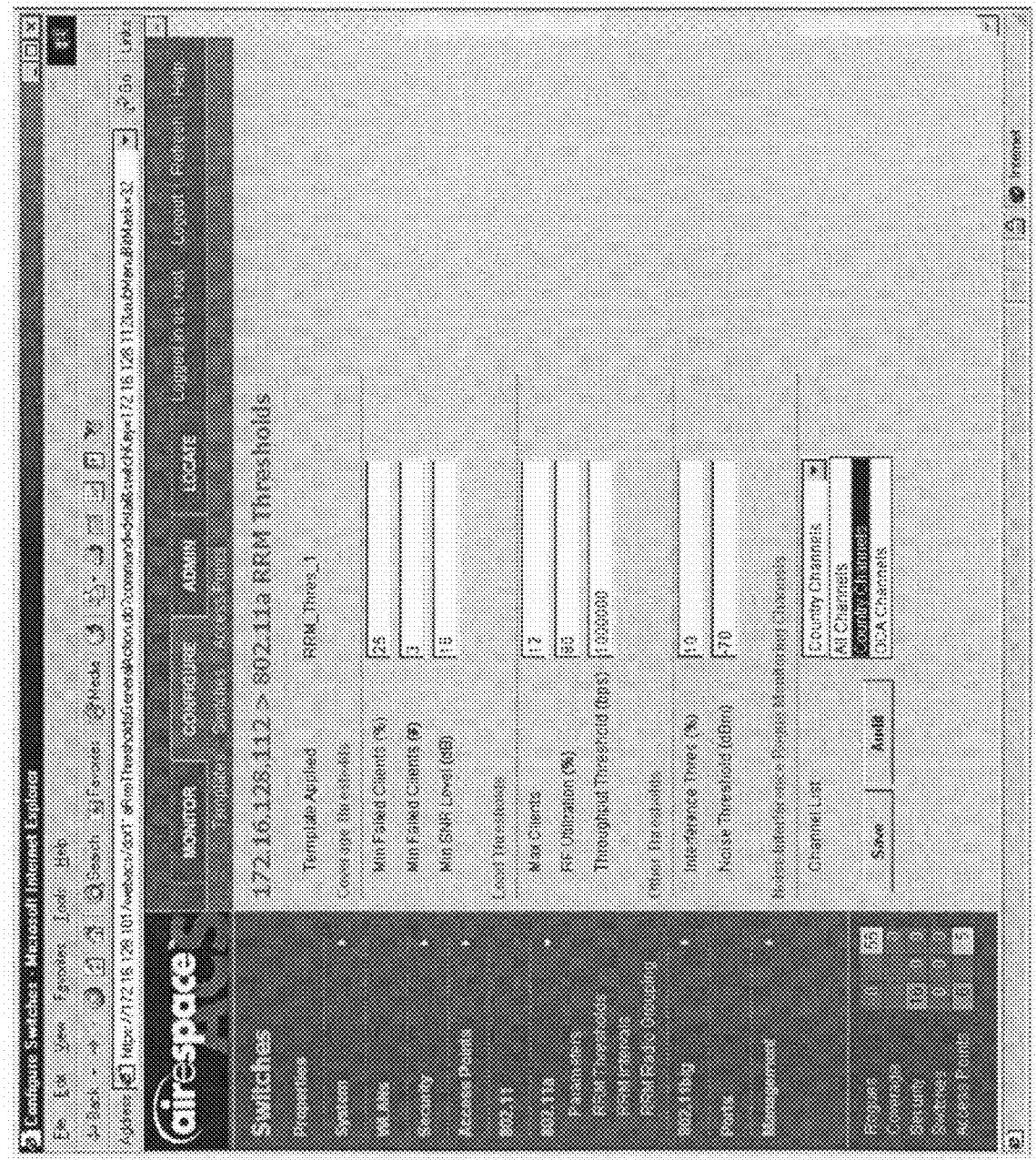
Fig._18

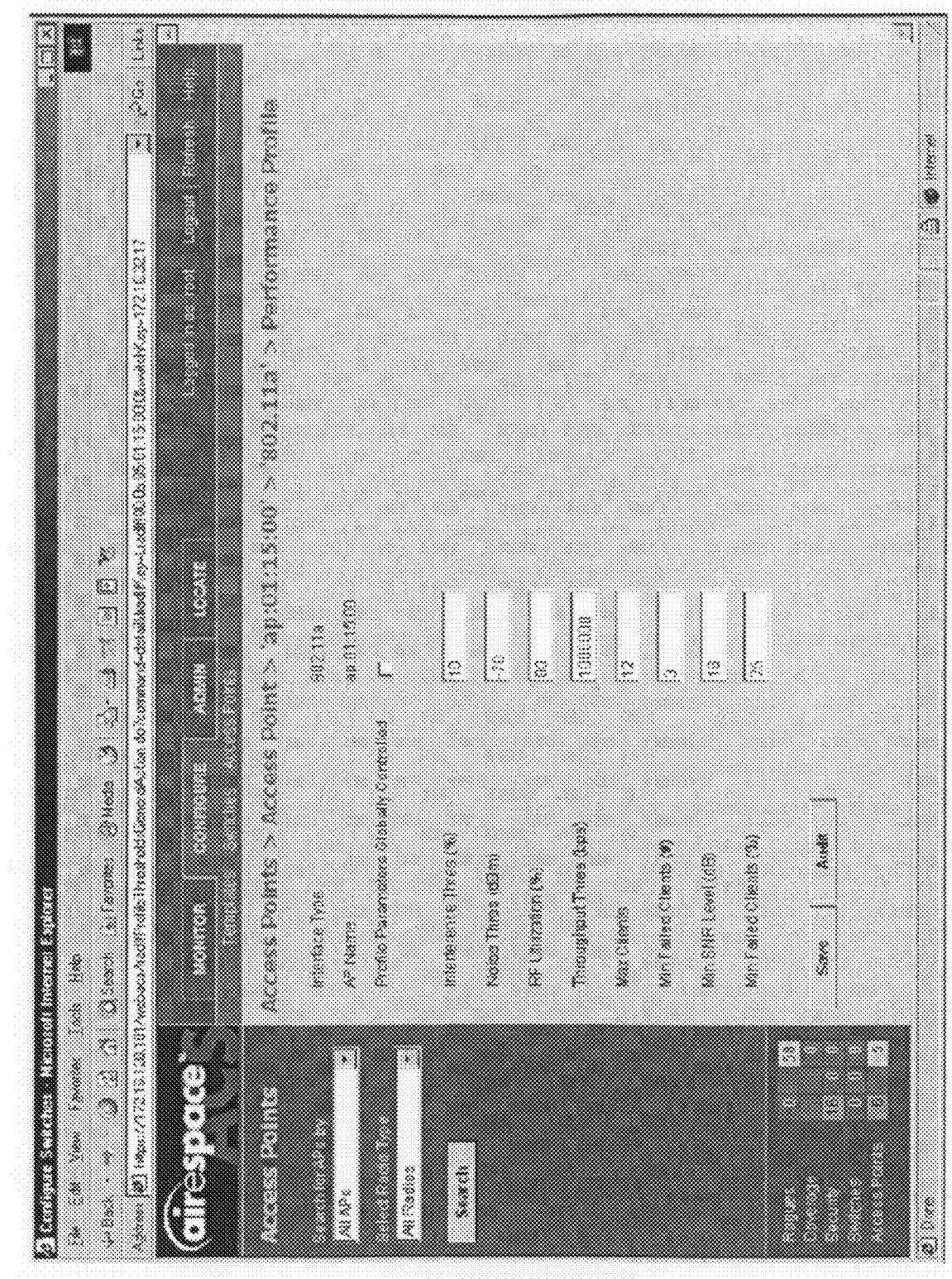
Fig_19

GRAPHICAL DISPLAY OF STATUS INFORMATION IN A WIRELESS NETWORK MANAGEMENT SYSTEM

CROSS-REFERENCE TO RELATED APPLICATIONS

This application is a continuation of U.S. application Ser. No. 10/982,390 filed Nov. 5, 2004 and entitled "Graphical Display of Status Information in a Wireless Network Management System".

This application makes reference to the following commonly owned U.S. patent applications and/or patents, which are incorporated herein by reference in their entirety for all purposes:

U.S. patent application Ser. No. 10/155,938 in the name of Patrice R. Calhoun, Robert B. O'Hara, Jr. and Robert J. Friday, entitled "Method and System for Hierarchical Processing of Protocol Information in a Wireless LAN;"

U.S. patent application Ser. No. 10/394,905 in the name of Patrice R. Calhoun, Scott G. Kelly and Rohit Kumar Suri, entitled "Light-weight Access Point Protocol;"

U.S. patent application Ser. No. 10/407,357 in the name of Paul F. Dietrich, Robert J. Friday and Robert B. O'Hara, Jr., entitled "Automatic Coverage Hole Detection in Computer Network Environments;"

U.S. patent application Ser. No. 10/407,370 in the name of Patrice R. Calhoun, Robert B. O'Hara, Jr. and David A. Frascone, entitled "Wireless Network System Including Integrated Rogue Access Point Detection;"

U.S. patent application Ser. No. 10/407,584 in the name of Patrice R. Calhoun, Robert B. O'Hara, Jr. and Robert J. Friday, entitled "Method and System for Hierarchical Processing of Protocol Information in a Wireless LAN;"

U.S. patent application Ser. No. 10/447,735 in the name of Robert B. O'Hara, Jr., Robert J. Friday, Patrice R. Calhoun, and Paul F. Dietrich, entitled "Wireless Network Infrastructure including Wireless Discovery and Communication Mechanism;"

U.S. application Ser. No. 10/611,522 in the name of Robert J. Friday, entitled "Non-Overlapping Antenna Pattern Diversity In Wireless Network Environments;"

U.S. patent application Ser. No. 10/802,366 in the name of Paul F. Dietrich, Gregg Scott Davi and Robert J. Friday, entitled "Location of Wireless Nodes Using Signal Strength Weighting Metric;" and U.S. patent application Ser. No. 10/848,276 in the name of Paul F. Dietrich, Gregg Scott Davi and Robert J. Friday, entitled "Wireless Node Location Mechanism Featuring Definition of Search Region to Optimize Location Computation."

FIELD OF THE INVENTION

The present invention relates to network management systems and, more particularly, to methods, apparatuses and systems directed to, or facilitating, the graphical display of status information in a wireless network management system.

BACKGROUND OF THE INVENTION

Market adoption of wireless LAN (WLAN) technology has exploded, as users from a wide range of backgrounds and vertical industries have brought this technology into their homes, offices, and increasingly into the public air space. This inflection point has highlighted not only the limitations of earlier-generation systems, but the changing role WLAN technology now plays in people's work and lifestyles, across the globe. Indeed, WLANs are rapidly changing from convenience networks to business-critical networks. Increasingly users are depending on WLANs to improve the timeliness and productivity of their communications and applications, and in doing so, require greater visibility, security, management, and performance from their network.

As enterprises and other entities increasingly rely on wireless networks, the monitoring and configuration of wireless access points in a wireless network environment becomes critical to performance and security. Wireless network systems deployed in a typical enterprise environment, however, can comprise a large number of elements that must be managed, such as wireless access points and wireless switches. Accordingly, network management systems are generally required to monitor operation of the wireless network and manage the wireless network elements that provide wireless service.

A network management system is a software system that controls, manages, and retrieves status information from devices in a communications network. Generally speaking, a network management system includes functionality to administer and manage a network, such as network topology, software configuration, downloading of software, network performance monitoring, network operation and maintenance, and observing and troubleshooting problems. In many implementations, a network management system is typically run on a workstation that presents a graphical user interface (GUI) to a network administrator and provides access to a wide variety of information regarding network configuration, performance, and status. To gather information, network management systems often exchange information with the managed network elements using a network management protocol, such as the Simple Network Management Protocol (SNMP).

The status or security information associated with wireless networks, in which a network administrator may be interested, includes the operational status of the access points, the load on the access points, the presence of rogue access points, and radio frequency statistics, such as coverage, signal strength, and interference. Indeed, management of enterprise or other large-scale wireless networks requires frequent monitoring of a variety of status information to ensure that adequate service levels are achieved. The large amounts of information can become unwieldy as the number of managed elements increases. While network management systems generally allow network administrators to specify a variety of filters and generate different reports, the network administrator must often wade through vast amounts of information to identify potential or actual problems, which can be a time consuming and inefficient process.

In light of the foregoing, a need in the art exists for methods, apparatuses and systems that facilitate the monitoring and management tasks associated with wireless network systems. A need also exists for methods, apparatuses and systems that allow network administrators to quickly view status information and 'drill down' to different geographies, campuses, buildings, floors and other regions within a wireless network environment for better visibility and control. Embodiments of the present invention substantially fulfill these needs.

SUMMARY OF THE INVENTION

The present invention provides methods, apparatuses and systems directed to, or facilitating, the graphical display of status information in wireless network management systems.

In one implementation, the present invention provides a graphical user interface that allows a network administrator to readily ascertain the overall status of a wireless network, and quickly identify the network element(s) within the network that are associated with any potential problem or condition of interest. In another implementation, the present invention provides a graphical user interface that provides status icons that efficiently convey status information for corresponding access points. In another implementation, the present invention provides a hierarchical network model that facilitates network data management, configuration, and display tasks associated with wireless network management systems.

DESCRIPTION OF THE DRAWINGS

FIG. 1 is a functional block diagram illustrating the logical network topology of a wireless network system according to one implementation of the present invention.

FIG. 2 is a block diagram showing the hierarchical data model of a wireless network system implemented in the wireless network management system according to an implementation of the present invention.

FIG. 7 is a table that defines the data fields, according to one implementation of the present invention, in a serviceDomain object.

FIG. 8 illustrates a graphical user interface facilitating the configuration of a new campus data structure.

FIG. 9 provides a graphical user interface directed to configuration of a building object within a campus.

FIG. 10B shows a graphical configuration interface facilitating configuration of an area map within a floor level of a building.

FIGS. 11*a* thru 11*k* and 11*m* thru 11*r* illustrate different possible graphical states for the access point status icons.

FIGS. 12*a* thru 12*d* show access point status icons and some of the information that can be included in display flags appended to the icons.

FIG. 14 is a functional block diagram setting forth the components of a wireless network management system, according to one embodiment of the present invention.

FIG. 15 illustrates a graphical configuration interface facilitating the configuration of access points within an area map.

FIG. 16 illustrates a graphical configuration interface allowing for the selection of access points for addition to an area map.

FIG. 17 provides a graphical configuration interface facilitating the location of an access point within an area map.

FIG. 18 shows a graphical configuration interface allowing a user to specify global profile threshold values.

FIG. 19 sets forth a graphical configuration interface directed to setting a profile for a single access point.

DESCRIPTION OF PREFERRED EMBODIMENT(S)

A. Exemplary Wireless Network System Architecture

Figure 3A:
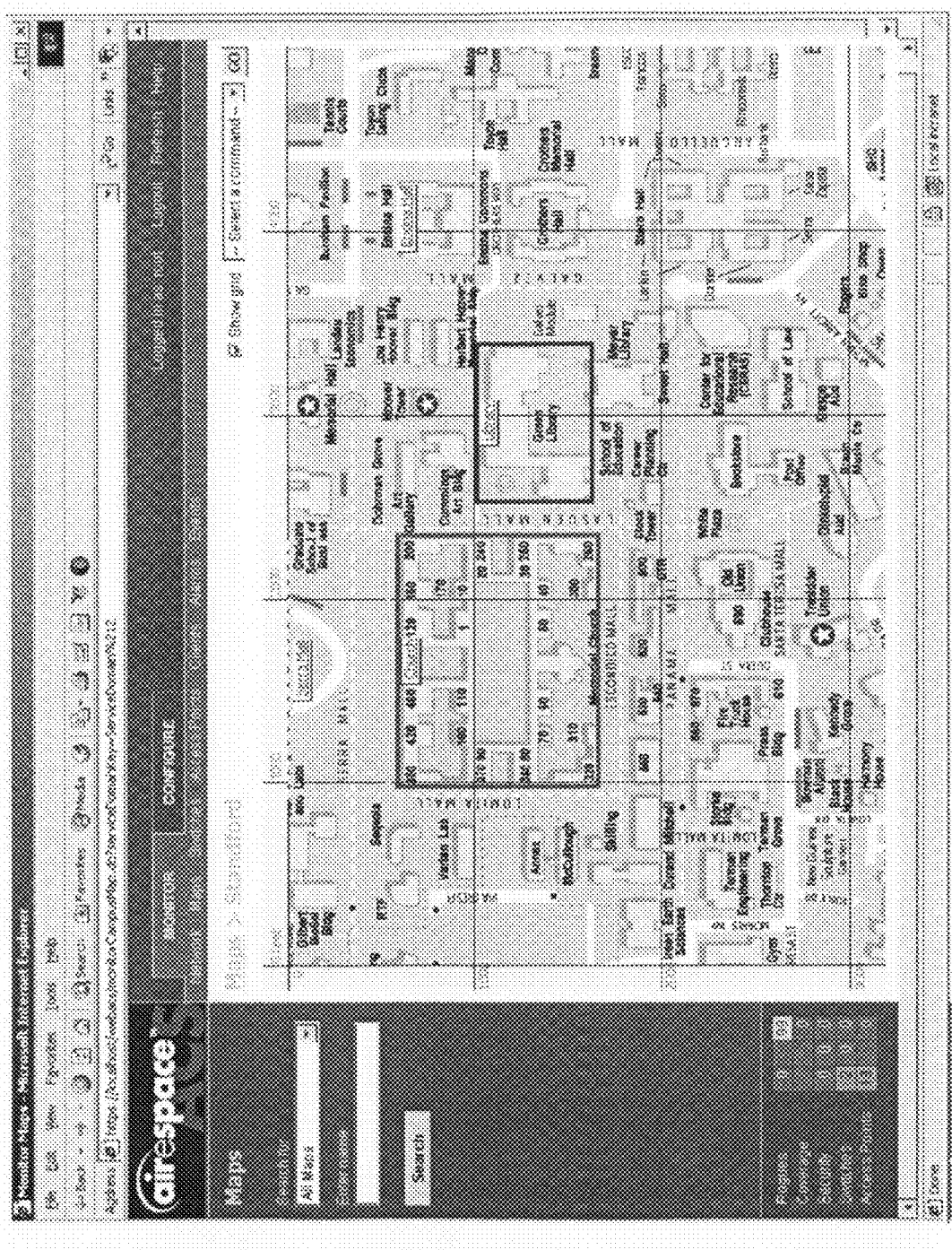
FIG. 3A provides a graphical user interface, according to one embodiment of the present invention, that provides a view of the campus.

FIG. 1 illustrates the logical network topology of a wireless network system according to one implementation of the present invention. As FIG. 1 illustrates, the wireless network system, according to one embodiment, comprises a plurality of wireless switches 40, a plurality of access points 42, and a wireless network management system 30. As FIG. 1 illustrates, these network elements are operably connected to network 50. Network 50, in one implementation, generally refers to a computer network, such as a Local Area Network (LAN), a Wide Area Network (WAN), etc., that includes one or more wireline network segments. Of course, network 50 can include a variety of transmission technologies and components, such as terrestrial WAN links, satellite links, and cellular links.

Wireless switch 40 operates in connection with one or more access points 42 to provide wireless network service to a plurality of mobile stations. In one embodiment, the wireless switches 40 and access points 42 operate according to the IEEE 802.11 WLAN standard. U.S. patent application Ser. Nos. 10/155,938 and 10/407,584 disclose the architecture and operation of wireless switches 40 and access points 42 according to one implementation of the present invention. In one embodiment, wireless switches 40 and access points 42 implement the Light-Weight Access Point Protocol (LWAPP) (see Calhoun et al., Light-Weight Access Point Protocol (LWAPP), http://www.ietf.org/internet-drafts/draft-ohara-capwap-lwapp-00.txt, incorporated by reference herein) to exchange messages containing operational, status, management and/or configuration data. In one implementation, wireless switch 40 can be the Airespace® 4000 WLAN Switch, while the access points 42 can be Airespace® 1200 access points, both of which are offered by Airespace, Inc. of San Jose Calif. Wireless switch 40 is connected to network 50 or to a LAN segment within network 50. Other wireless network system architectures are possible. For example, one or more of the access points 42 can be directly connected to a LAN segment of network 50, as disclosed in U.S. patent application Ser. No. 10/407,584. Still further, one or more of the access points 42 can operate in a dual- or multi-mode configuration that concurrently implements the IEEE 802.11a and IEEE 802.11b/g protocols. In addition, one or more of the access points 42 can be substantially autonomous wireless access points that are directly connected to network 50 or connected to wireless switch 40 for management and configuration purposes. In other implementations, the wireless network system can comprise an array of substantially autonomous wireless access points in a "fat AP" or peer-to-peer system architecture, such as the Structured Wireless-Aware Network Framework offered by Cisco Systems, Inc. of San Jose, Calif.

In the implementation shown in FIG. 1, however, wireless switch 40 connects to each access point 42 via Ethernet connections (other link layer technologies can be used), and is operative to manage the connections between the access points 42 and the mobile stations. As discussed in the above-identified patent applications, wireless switch 40 gathers data relating to operation of the access points 42 by monitoring wireless frames transmitted by the access points 42 to the wireless switches 40. In one implementation, the wireless switches 40 obtain operational and status data (e.g., signal strength data, interference, load, etc.) from reserved fields in headers that encapsulate wireless frames. Access points 42 in one implementation also transmit management or control frames to the wireless switches at periodic intervals (or in response to requests) to the wireless switches 40. Operational and configuration data may also be obtained from the access points 42 using a network management communications protocol, such as SNMP. Wireless switches 40 also delivers switching and, optionally, Power over Ethernet (PoE) on each interface to which an access point 42 connects. PoE functionality can be used to power access points 42 or any third-party 802.3af compliant device. As discussed in the above-identified patent applications, wireless switches 40, in one implementation, provide seamless intra-subnet and inter-subnet roaming across the access points 42. In one implementation, wireless switches 40 are operative to automatically discover newly installed access points 42 (or vice versa) using Layer 2 and/or Layer 3 discovery mechanisms and provide information relating to the discovered access points 42 to wireless network management system 30. U.S. patent application Ser. No. 10/394,905 describes a light-weight access point protocol that allows access points 42 to automatically discover and associate with a wireless switch 40.

Wireless network management system 30 facilitates monitoring and management of the wireless network system. In one implementation, wireless network management system 30 is a server or other computing device that includes software applications comprising a collection subroutines, functions, libraries and/or modules that implement the functionality described herein. As FIG. 1 illustrates, wireless network management system 30, in one implementation, incorporates HTTP server 32 to allow users to access the functionality of the wireless network management system 30 using a conventional browser installed on client computer 34. In the wireless system architecture of FIG. 1, wireless network management system 30 employs SNMP to gather operational data from the wireless switches 40, which in turn gather operational data from the access points 42 (using LWAPP, for example). In other system architectures, wireless network management system 30 can be configured to communicate directly with the access points 42. As discussed in more detail below, network management system 30, in one implementation, is configured to poll wireless switches 40 on a periodic basis and then populate/update a database 44 that contains status information for the access points 42. In one implementation, wireless network management system 30 can also be configured to poll the wireless switches 40 in response to a request by a network administrator (e.g., such as for a list of mobile stations currently associated with a selected access point). Still further, wireless network management system 30, in connection with wireless switches 40 and access points 42, is also operative to detect rogue access points and clients. U.S. patent application Ser. No. 10/407,370 discloses a wireless network system included integrated rogue access point detection. Wireless network management system 30, in one implementation, can also estimate the location of wireless devices, such as mobile stations and rogue access points. U.S. application Ser. Nos. 10/802,366 and 10/848,276 disclose wireless node location systems that can be incorporated into embodiments of the present invention.

FIG. 14 illustrates some of the functionality, according to one embodiment, incorporated into wireless network management system 30. As FIG. 14 illustrates, wireless network management system 30 comprises network management application 35, data gathering engine 39, and database connectivity module 38. Network management application 35 includes software modules and subroutines that implement the functions and work flows described below. In one implementation, network management application 35 includes interface rendering module 37 and configuration module 36. Interface rendering module 37 generates the graphical user interfaces described below given a set of data objects and instructions passed to it. In one implementation, interface rendering module 37 is operative to generate page-based interfaces, such as HTML pages. In some implementations, the page-based interfaces include embedded code objects, such as Javascript and the like. Configuration module 36 includes logic directed to the configuration of wireless network management system 30. Configuration module 36, in one implementation, operates in connection with interface rendering module 37 to provide configuration interfaces to the user. Data gathering engine 39 is operative to gather data from the managed access points 42 and wireless switches 40. As discussed more fully below, data gathering engine 39, in one implementation, is operative to poll a set of managed devices on a periodic basis, and/or receive traps (e.g., SNMP traps) from the managed devices. Data gathering engine 39 is also operative to access a database 44, via database connectivity module 38, to store data received from the managed devices in suitable tables and fields, as discussed more fully below. In one implementation, data gathering engine 39 includes SNMP mediation and fault detection modules which collect/receive data through SNMP protocols. In one implementation, wireless network management system 30 stores data in a database 44. Data gathering engine 39 is operative, in one implementation, to mediate between the MIB data formats and the database schema implemented on database 44. In one implementation, data gathering engine 39 is operative to mediate between the MIB data formats and an object-oriented database schema, such as a Java database.

B. Hierarchical Network Data Model and User Interface

FIG. 2 illustrates the hierarchical data model of a wireless network system implemented in the wireless network management system 30 according to an implementation of the present invention. The nodes of the hierarchical data model are each data structures, such as objects, records or other elements, that include a plurality of data fields, as discussed more fully below. At the top level of the hierarchy, a campus node 20 generally corresponds to an area or region that geographically or logically encompasses an entire wireless network domain or system. For example, the area or region corresponding to campus node 20 can encompass the building and grounds of a complex, such as a university, college, industrial park, corporate facility or military establishment. Below the campus node 20, one implementation of the present invention supports two node types: 1) building node 22 and an outdoor region node 24. A building node 22 generally corresponds to a building or other physical structure located within the region defined by the campus node 20. An outdoor region node 24 generally corresponds to an outdoor area within the region corresponding to the campus node 20. As FIG. 2 shows, a building node 22 may contain one to a plurality of floor area nodes 25a. The floor area nodes 25a, such as Floor Area L1, Floor Area L2, generally correspond to different floors within the building or other physical structure. Each floor area node 25a includes one or more area maps 26 (e.g., MAP_1, MAP_2, etc.) that generally correspond to separately defined regions within the level corresponding to a given floor area. Often, a floor map area 25a contains a single area map 26, as most floor areas or levels are typically modeled as a unitary region. However, a network administrator may, in some circumstances, configure a building node 22 to correspond to a plurality of closely spaced buildings. In such a configuration, each area map 26, in one implementation, corresponds to a given floor level in a specific physical building in the plurality of buildings. In one implementation, the area maps 26 are typically displayed within the context of a window corresponding to the floor area node 25a, with which they are associated. Furthermore, the area maps 26 typically contain one or more pointers to data objects elements that model the access points deployed within the corresponding area. Similar to building nodes 22, outdoor region node 24 includes an area node 25b, which generally corresponds to the region associated with outdoor region node 24. Additionally, area node 25b contains one or more area maps 26.

B.1. Graphical User Interface—Domain & Campus Views

Figure 3B:
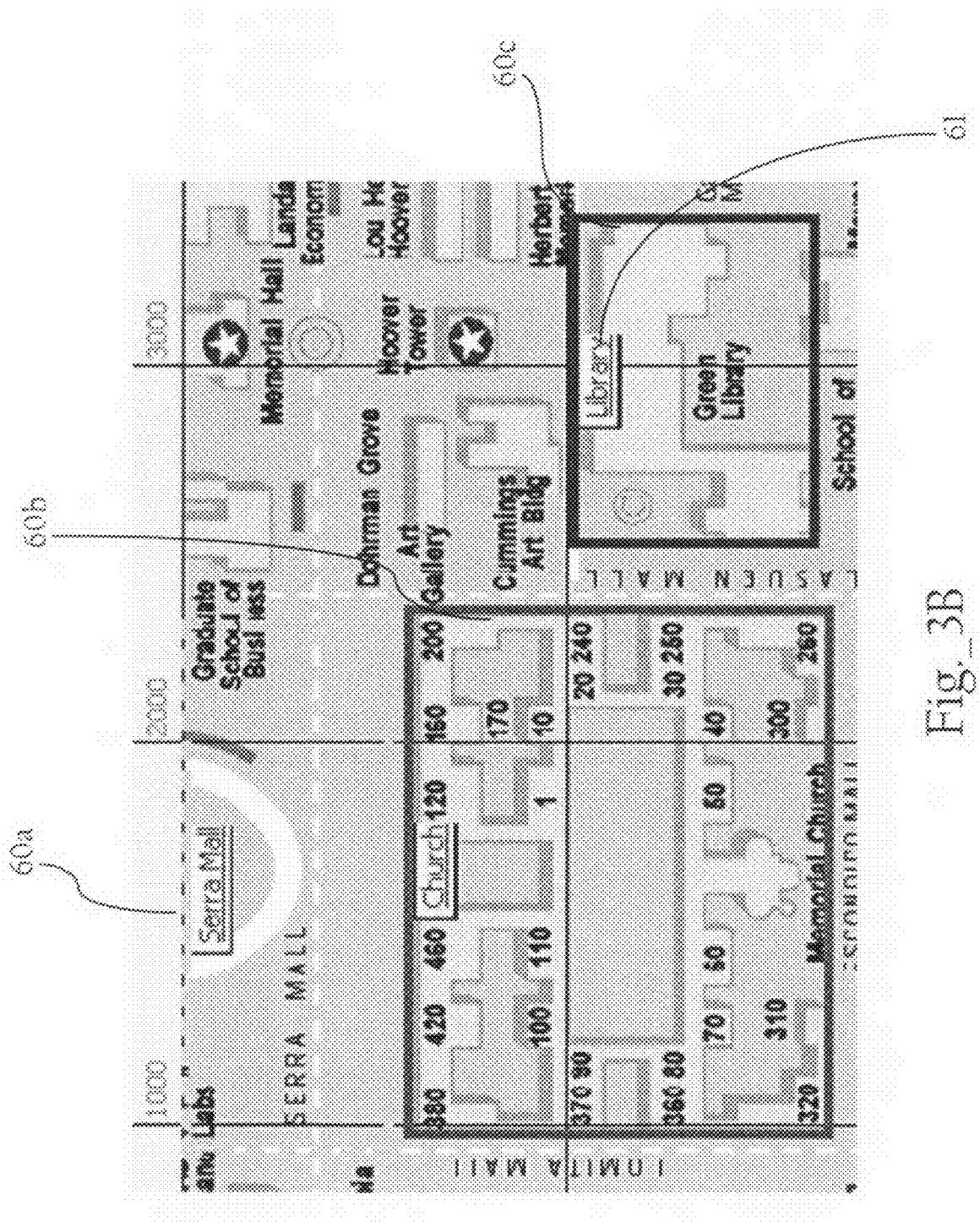
FIG. 3B provides an enlarged view of a portion of the image presented in the graphical user interface of FIG. 3A.

FIG. 3A shows a graphical user interface, according to an implementation of the present invention, that provides a view of the campus. As FIG. 3A illustrates, the graphical user interface presented by wireless network management system 30 presents a raster or vector based representation of the campus. FIG. 3B provides an enlarged view of a portion of the image presented in the graphical user interface of FIG. 3A. As FIG. 3B illustrates, the campus view includes a plurality of graphical boundaries 60a, 60b, 60c encompassing depicted regions within the campus view. In the implementation shown, the graphically bounded regions are regions defined by a network administrator and correspond to various buildings or outdoor regions that each include wireless network equipment, such as wireless switches 40 and/or access points 42. Specifically, in the implementation shown, graphical boundary 60b encompasses a building identified as "Church", while graphical boundary 60c encompasses a building identified as "Library." Graphical boundary 60a graphically encompasses an outside area identified as "Serra Mall." These graphically bounded regions correspond to building nodes 22 and outdoor region node 24 in the hierarchical model discussed above. In one implementation, wireless network management system 30 graphically distinguishes between building nodes 22 and outdoor area nodes 24 by using dashed lines on the boundary 60c of outdoor area nodes. Of course, this relation could be reversed. In addition, other line types beyond dashed lines can be used to differentiate regions corresponding to building nodes 22 from regions corresponding to outdoor region nodes 24.

As discussed in more detail below, wireless network management system 30 modulates an attribute of the graphical boundaries 60a, 60b, 60c to indicate the status of one or more devices associated with the wireless network system located within the region defined by the respective boundaries. For example, wireless network management system 30, in one implementation, uses different colors for the graphical boundaries to provide different status indications. More specifically, and in one implementation, a green-colored boundary indicates that all access points 42 within the bounded region are 1) operational, 2) performing within all associated load, coverage, noise and interference thresholds, and 3) no critical, major, or minor alarms have been reported. The green-color status indicator may also indicate that no rogue access points have been detected within the bounded region. In one implementation, wireless network management system 30 may use a yellow boundary to indicate that one or more access points 42 within the bounded region have experienced a threshold profile failure (such as exceeding a load threshold). In one implementation, wireless network management system 30 allows a network administrator to define a profile including one to a plurality of the following attributes related to the operation of access points 42: 1) Interference, 2) Load, 3) Coverage and 4) Noise (see below). For example, a network administrator may configure a profile by selecting all of the above-identified attributes and configuring threshold values, the crossing of any of which is deemed a profile failure. For example, if the load reported by a given access point 42 is above the configured threshold, wireless network management system 30, in one implementation, indicates a profile failure by rendering a yellow graphical boundary for the region encompassing the given access point. Still further, wireless network management system 30, in one implementation, indicates the non-operational status of one or more access points within a given region with a red-colored boundary. In one implementation, wireless network management system 30 can also be configured to indicate a possible rogue access point with a red-colored boundary as well.

Figure 4:
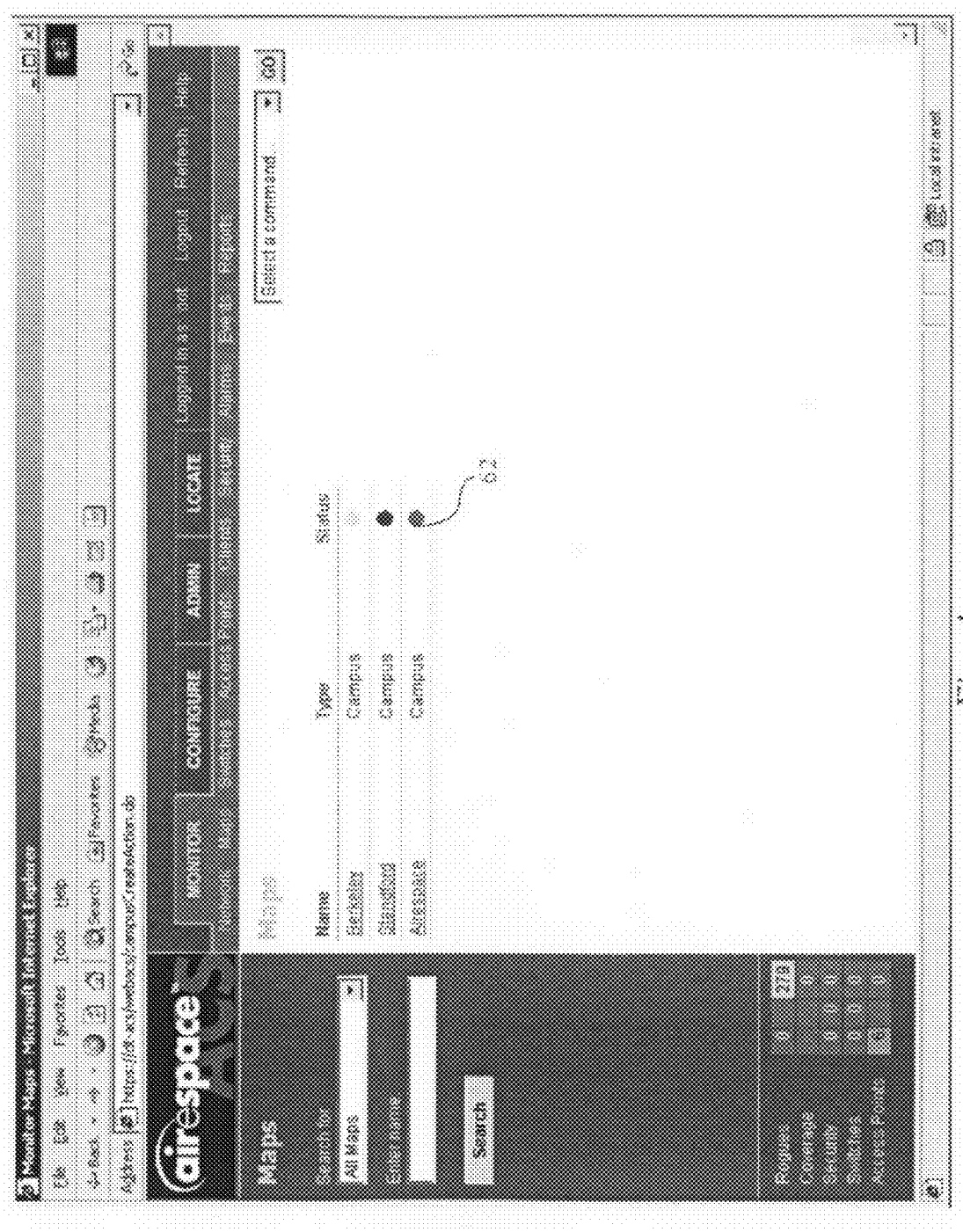
FIG. 4 sets forth a graphical user interface presenting a list of campuses and corresponding status information.

As FIG. 4 illustrates, wireless network management system 30 can implement the same concept at a higher level to indicate the overall status of the wireless network for entire campuses. In one implementation, the graphical user interface illustrated in FIG. 4 lists campuses by name or other identifier, and includes a status icon that, as discussed above, indicates the status of the wireless network for the corresponding campus. A variety of embodiments are possible. For example, wireless network management system 30 can be configured to use additional colors as status indicators for detected rogues or other network conditions. Furthermore, wireless network management system 30 may modulate the line style (e.g., dashed lines, jagged lines, flashing lines, etc.) of the graphical boundaries 60a, 60b, 60c to provide status indications. Still further, wireless network management system 30 may also indicate multiple status indications by using more than one color to render the graphical boundaries 60a, 60b, 60c, such as in alternating segments of a first color and a second color. In another implementation, wireless network management system 30 can be configured to shade the region encompassed by the graphical boundaries with a hue or color as a status indicator. Still further, one skilled in the art will also recognize that the status indicators accorded to any given region can be based on a variety of event triggers configured by a network administrator.

B.2. Building and Floor Area Views

Figure 5:
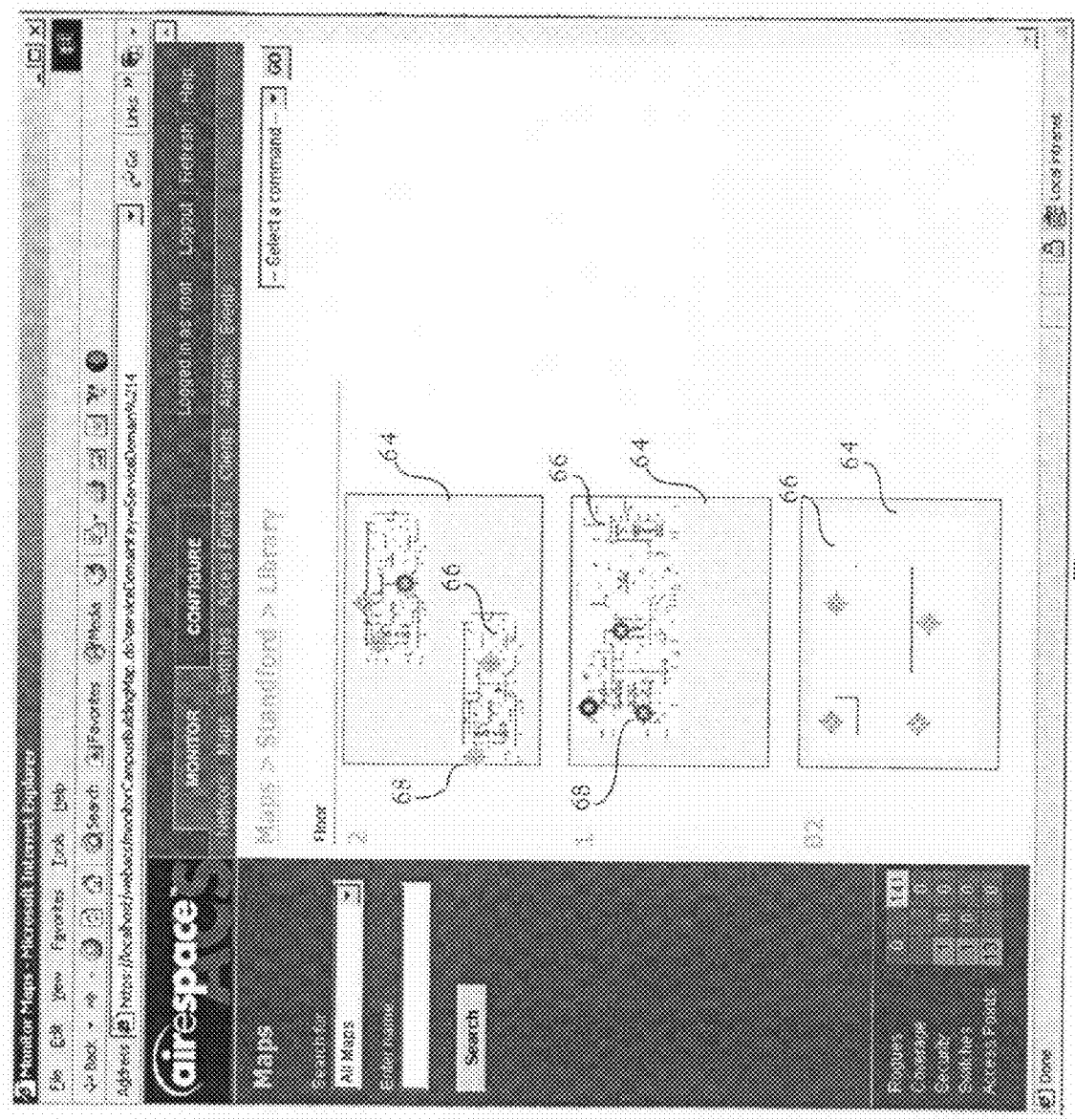
FIG. 5 illustrates a graphical user interface presenting a building level view including a plurality of floor levels.

As one skilled in the art will readily appreciate, the graphical user interfaces illustrated in FIGS. 3A, 3B and 4 allow a network administrator to quickly and efficiently pinpoint problems, potential problems, conditions of interest, and/or profile failure conditions by viewing the status indications at the administrative domain level (if more than one campus) has been configured, and then navigating through the campus level to determine the collective status of the access points within specific building(s) and/or outside areas. As discussed more fully below, wireless network management system 30 also allows the user to navigate quickly to maps corresponding to the building(s) or outside region(s) based on the status indications. FIG. 5, for example, shows a graphical user interface presented by wireless network management system 30 after a network administrator has clicked on the "Library" link in the interface depicted in FIGS. 3A and 3B.

More specifically, FIG. 5 shows a graphical user interface presenting a building level view of a given building within the campus. The graphical user interface, in one implementation, includes floor area windows 64, corresponding to the floors associated with the building, that include thumbnail or other small representations of the area maps 66 associated with each floor area. In the implementation shown, the floor area windows 64 include status icons 68 that identify the location and status of access points 42 within the regions corresponding to area maps 66. The user may click on a floor area window 64 to view a larger representation of the area map 66 and, as discussed more fully below, select specific access point icons 68 to obtain detailed status indications.

Figure 6:
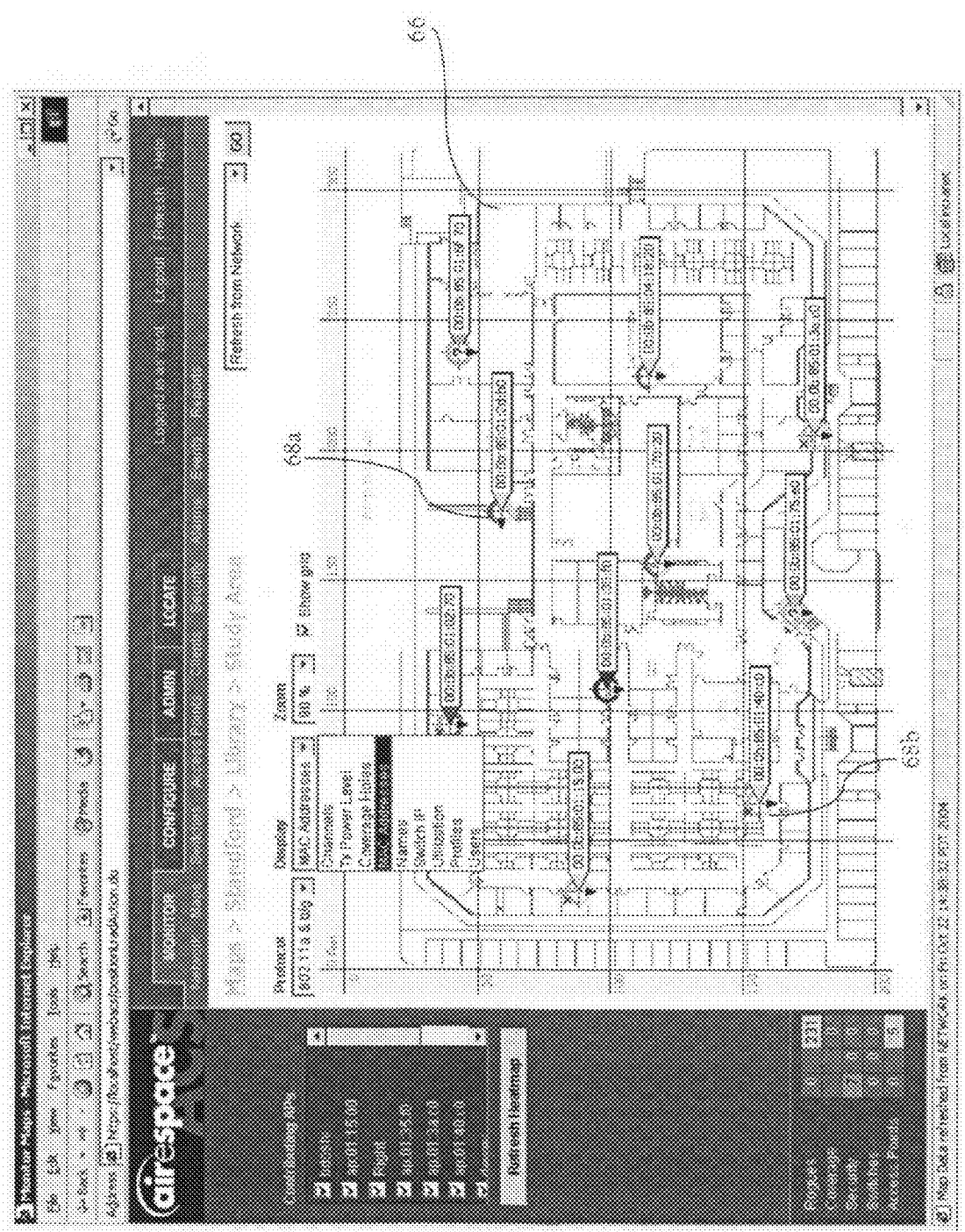
FIG. 6 shows a graphical user interface presenting a floor level view including an area map.

FIG. 6 shows a graphical user interface containing an area map 66 associated with a floor area of a given building. As FIG. 6 illustrates, area map 66, in one implementation, includes a raster or vector image of the physical area corresponding to the area map and includes one or more access point status icons 68a, 68b. As discussed in more detail in the following section, the graphical configuration of the access point status icons quickly and efficiently indicates an array of status and configuration information.

B.3. Access Point Status Icons

FIGS. 11a thru 11o represent different possible graphical states associated with the access point status icons, according to one implementation of the present invention. As discussed herein, wireless network management system 30 is operative to select the graphical state of an access point status icon depending on the status of the corresponding access point 42. As FIG. 11p illustrates, the access point status icons, in one implementation, comprise horizontal and vertical cross hairs 71 and 72, a ring 73 centered at the intersection of the cross hairs 71 and 72, and a triangular pointer 74. In one embodiment, the intersection of the cross hairs 71, 72 corresponds to the location of the corresponding access point 42, and thus facilitate placement of the access point icons within the area map (see below). Wireless network management system 30, in one implementation, is operative to modulate an attribute of the access point status icons to indicate a variety of status conditions as discussed in more detail below.

Table 1, below, illustrates the access point status icons used in wireless network management system 30 according to one embodiment of the present invention. As Table 1 illustrates, the ring 73 of each status icon can be split (either horizontally, as shown, or vertically) to indicate the status of different operational modes of a given access point. In one implementation, when a status icon represents a multi-mode access point having an 802.11a radio and an 802.11b/g radio, the top-half of ring 73 represents the status of the 802.11a radio interface (and associated components), while the bottom half represents the status of the 802.11b/g radio interface (and associated components). However, for single mode access points, the entirety of the icon represents the status of the corresponding access point. In other implementations, the graphical user interface includes a pull-down menu that allows the user to select either the 802.11a or 802.11b/g protocol, or both. If a single protocol is selected, the entirety of the status icon indicates the status of the selected protocol (802.11a or 802.11b/g); however, if both protocols are selected, the status information on the status icon is split between the vertical or horizontal cross hairs 71, 72, as discussed above.

TABLE 1

| Icon | Description |
| --- | --- |
| FIG. 11a | FIG. 11a illustrates a status icon where the ring and pointer are green indicating no faults or profile failures. In embodiments with multi-mode access points, the top half of the ring represents the status of the 802.11a radio of the access point, while the bottom half of the ring represents the state of the 802.11b/g radio. |
| FIG. 11b | FIG. 11b illustrates a yellow status icon, which indicates a minor fault. As above, the top half of the ring represents the status of the 802.11a radio of the access point, while the bottom half of the ring represents the state of the 802.11b/g radio in multi-mode access points. In one implementation, a flashing yellow icon indicates that there has been an 802.11a or 802.11b/g interference, noise, coverage or load Profile Failure. |
| FIG. 11c | A red status icon indicates a major or critical fault. |
| FIG. 11d | A grayed-out status icon with a question mark in the middle represents an unreachable access point, whose exact status cannot be determined. |
| FIG. 11e | A grayed-out icon without a question mark in the middle represents an access point that has yet to associate or register with a wireless switch. |
| FIG. 11f | A status icon with a red "x" in the center of the ring represents an access point that has been administratively disabled. |
| FIG. 11g | A status icon where the top half of the ring is green, and the lower half is yellow indicates that the 802.11a radio has no faults, while the 802.11b/g radio on the same access point has a minor fault. In one implementation, the more serious or critical of the two colors in the ring determines the color of the large triangular pointer. |
| FIG. 11h | A status icon where the top half of the ring is green and the lower half red indicates that the 802.11a radio is operational with no faults, while the 802.11b/g radio has a major or critical fault. |
| FIG. 11i | A status icon where the top half of the ring is yellow and the lower half red indicates that the 802.11a radio has a minor fault, while the 802.11b/g radio has a major or critical fault. |
| FIG. 11j | A status icon where the top half of the ring is yellow and the lower half green indicates that the 802.11a radio has a minor fault, while the 802.11b/g radio is operational with no faults. |
| FIG. 11k | A status icon where the top half of the ring is red and the lower half green indicates that the 802.11a radio has a major or critical fault, while the 802.11b/g radio is operational with no faults. |
| FIG. 11m | A status icon where the top half of the ring is red and the lower half yellow indicates that the 802.11a radio has major or critical faults, while the 802.11b/g radio has a minor fault. |

TABLE 1-continued

| Icon | Description |
| --- | --- |
| FIGS. _11n & 11o | Status icons with a red "x" on the top half (FIG. _11n) shows that the indicated radio (here, 802.11a) has been administratively disabled. Status icons with a red "x" on the bottom half (FIG. _11o) shows that the indicated radio (here, 802.11b/g) has been administratively disabled. The rest of the color coding is as described above. In the implementation described herein, there are six possibilities. |

B.3.1. Display Flags

As FIG. 12a illustrates, access point status icons 68 may also include display flags or banners 75 appended to the pointers 74. In one implementation, depending on the Display option selected by the user in pull-down menu 76, the display flag 75 attached to the right of the status icons displays additional information, as set forth below:

1) Channels: Shows the radio channel number as Ch#nn (see FIG. 12b), where nn is the channel number, or shows Unavailable for unconnected access points. For multimode access points, Ch#nn/mm shows the channel selection for both radios where nn is the channel for 802.11a radios and mm is the channel for 802.11b/g radios.

2) Tx Power Level: Shows the current radio transmit power level as Tx Power n, where n is power level 1 (high) through 5 (low), or shows Unavailable for unconnected access points.

3) Coverage Holes: Shows the percentage of clients whose signal has become weaker until the client lost its connection (see FIG. 12d), shows Unavailable for unconnected access points, or shows MonitorOnly for access points in Monitor-Only mode. U.S. application Ser. No. 10/407,357 discloses the detection of coverage holes in wireless networks.

4) MAC Addresses: Shows the MAC address of each access point (see FIG. 12a).

5) Names: Shows the operator-assigned access point name.

6) Switch IP: Shows the IP address of the wireless switch 40 with which the access point 42 is associated, or shows Not Associated for unconnected access points.

7) Utilization: Shows the percentage of bandwidth used by the associated mobile stations or wireless clients, shows Unavailable for unconnected access points, or shows MonitorOnly for access points in Monitor-Only mode.

8) Profiles: Shows the Load, Noise, Interference and Coverage components of the access point Profiles that include corresponding operator-defined thresholds for each component: Okay for thresholds not exceeded, Issue for exceeded thresholds, or Unavailable for unconnected access points.

9) Users: Shows the number of mobile station or wireless clients, shows Unavailable for unconnected access points, or shows Monitor-Only for access points in Monitor-Only mode.

B.3.2. Directional Arrows

In one implementation, one or more access points 42 include two directional antennas whose peak gains are offset from each other at a 180-degree angle, as illustrated and disclosed in U.S. patent application Ser. No. 10/611,522 (above). In one implementation, a first directional antenna is labeled as a "Side A" antenna, while a second directional antenna is labeled as a "Side B" antenna. For such access points, each of the corresponding status icons includes a small black directional arrow 76 (see FIG. 11e) that indicates the direction in which the "Side A" antenna is oriented. FIGS. 11q and 11r illustrate, for didactic purposes, other directional states for arrow 76. In one implementation, the direction of the Side A antenna is noted by the user who installed the corresponding access point, and is subsequently recorded using an access point configuration interface provided by wireless network management system 30.

B.4. Configuration Interfaces

Wireless network management system 30, in one implementation, also provides graphical configuration interfaces that facilitate the configuration of the data objects and elements discussed herein. For example, FIG. 8 illustrates a campus configuration interface that allows the network administrator to specify the name of the campus, and the contact email for the campus. As FIG. 8 illustrates, the campus configuration interface also allows the network administrator to import a bitmap image of the campus (see, e.g., FIG. 3A) and specify the overall horizontal (x-axis) and vertical (y-axis) dimensions corresponding to the bitmap image. After the network administrator completes the configuration interface, wireless network management system 30 creates a campus "serviceDomain" object in the database. Accordingly, from the campus view illustrated in FIG. 3A, a user may define one or more building(s) and/or outdoor area(s) within the campus.

FIG. 9 provides a graphical building configuration interface according to one implementation of the present invention. In the implementation shown, the building configuration interface requires the user to enter a building name, contact, the number of floors, and the number of basement levels. After entry of this information, the configuration interface presents a graphical boundary 60d whose position and size relative to the bitmap campus image the user can adjust using a mouse or other pointing device. The configuration interface facilitating creation of an outdoor area is substantially the same as the building configuration interface. In one implementation, however, a user may also associate a bitmap image of the outdoor area directly with the outdoor area object.

Figure 10A:
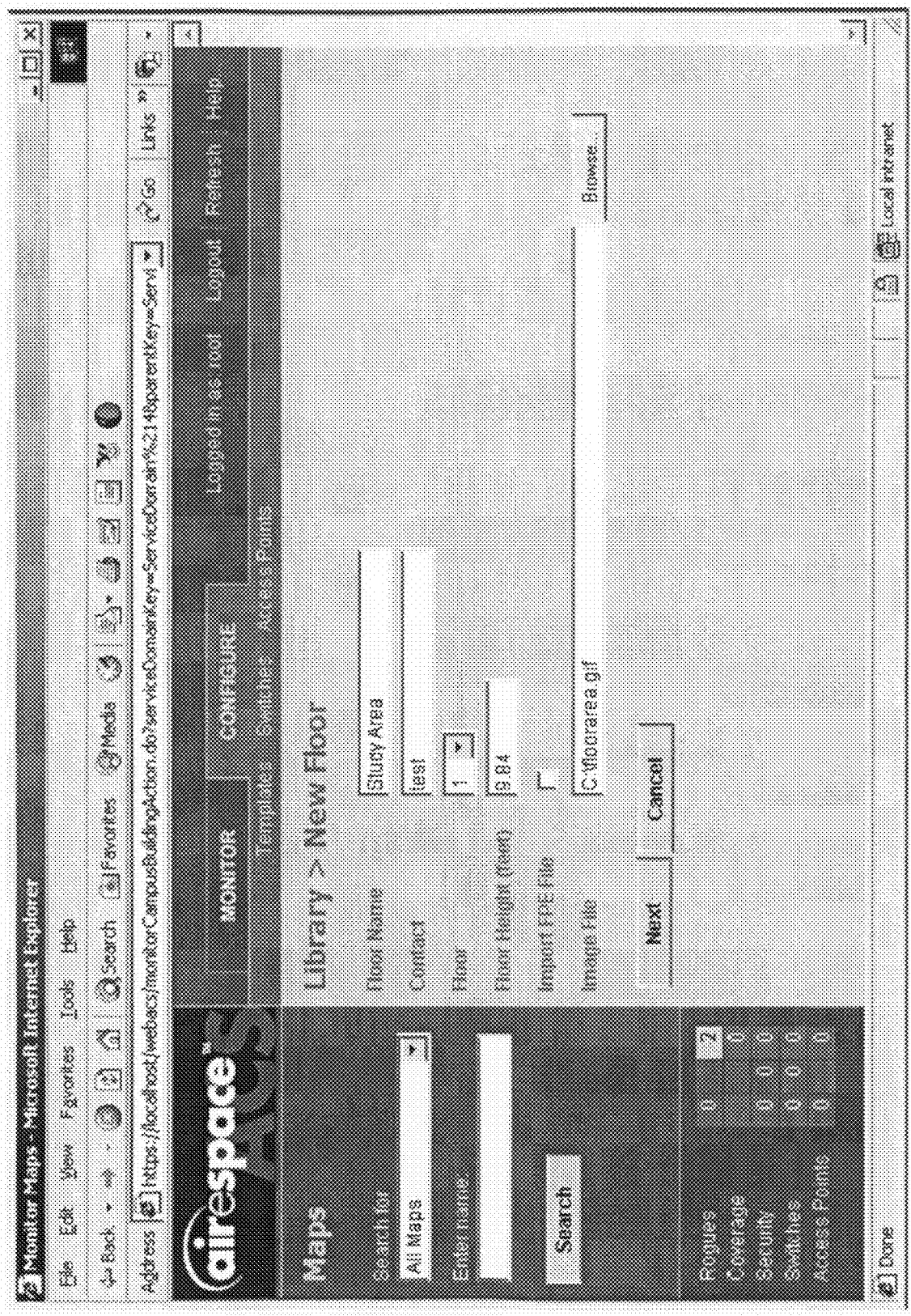
FIG. 10A sets forth a graphical configuration interface facilitating configuration of a floor level within a building.
Figure 13:
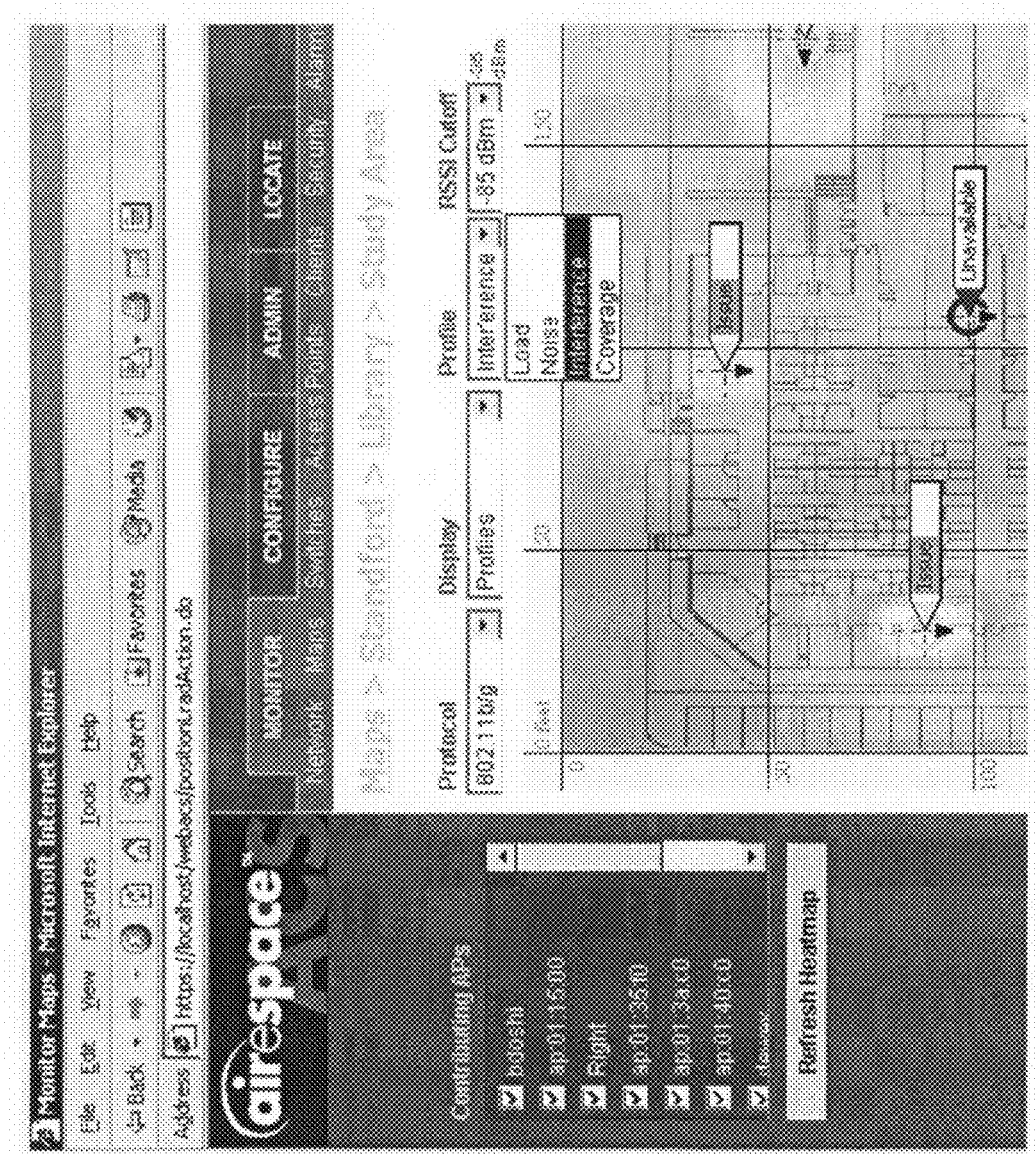
FIG. 13 shows a portion of a graphical user interface including access point status icons that indicate status information for corresponding access points.

FIGS. 10A and 10B set forth floor area and area map configuration interfaces according to one implementation of the present invention. As FIG. 10A illustrates, to configure a floor area, the user specifies a Floor Name, Contact, Floor Number, Floor height (e.g., z-axis dimension), and the location of a floor plan image (area map) in a bitmap (e.g., GIF, PNG or JPEG) format. When the user clicks the "next" button, wireless network management system 30 retrieves the area map, and presents the user with the configuration interface illustrated in FIG. 10B. As FIG. 10B illustrates, the user can position and resize the area map 66 within the floor area using a mouse. From the configuration interface illustrated in FIG. 10B, a user may also configure one or more wireless switches 40 and access points 42 that provide wireless network service to the corresponding floor area.

After configuring an area map 66 from the Floor View configuration interface, a user can choose the "Add Access Point" option from a drop-down menu to add an access point to the area (see FIG. 15). In one implementation, wireless network management system 30 retrieves a list of access points 42 identified by wireless switches 40 (using discovery mechanisms discussed above and reported to wireless network management system 30), and presents a list of access points that have not been previously associated with other area maps. As FIG. 16 illustrates, the user may choose one to a plurality of discovered access points to add to the area map. In addition, the user may also manually add other access points in other configuration interfaces. After the user selects the access point(s) 42 for addition to the area map, wireless network management system 30, in one embodiment, displays a configuration interface (see FIG. 17) showing the access point status icons 68 for all newly added access points at the top of the map in a horizontal line. The user can drag each status icon 68 to the position in area map 66 corresponding to the location where the access point 42 is actually located. In addition, the user can also specify the orientation of the "Side A" antenna using controls provided by the configuration interface. In one implementation, after the user has completed the configuration of the area map and access points, the resulting access point location and orientation information is recorded. A radio-frequency (RF) prediction tool can process the configuration data (and a vector representation of the area map) to provide a mathematical model of the propagation of RF signals transmitted by the access points within the region corresponding to the area map 66.

In addition, wireless network management system 30 provides a variety of other configuration interfaces that allow a network administrator to associate various data elements (such as the operational status of access points, profile elements, utilization, client count, and the like) gathered by the system with different fault or other status information types. Other configuration interfaces also allow the user to associate the different fault or information status types with corresponding status indication types, such as red (critical condition or failure), yellow (minor failure or condition), and green (no failures and/or conditions of interest). As discussed above, wireless network management system 30, in one implementation, also supports access point profiles that comprise data elements characterizing operation of the access points, such as RF coverage, observed load, interference, and noise. FIG. 18 illustrates the data elements associated with an access point profile according to one implementation of the present invention. As FIG. 18 illustrates, threshold values for each attribute of the profile can be configured globally for all access points on a per-protocol basis (i.e., 802.11a and b/g separately). In addition, threshold values for the access point profile can be configured for individual access points as well. In one implementation, the individual configurations override the global configuration. As discussed herein, the values of the profile thresholds and the data corresponding to a given access point determine the status indications that are displayed to the user at the access point level and above.

C. Network Management System Implementation and Data Structures

The following describes some of the data structures implemented by wireless network management system 30 to support and facilitate the functionality described above. As discussed above, wireless network management system 30 is operative to mediate between the MIB data formats implemented on wireless switches 40 and the database schema implemented on database 44 to store network management data.

C.1. Back-End Data Structures

In one implementation, the geographical elements of the environment (campus, building, outdoor region, and floor areas) are represented as a serviceDomain object. In one implementation, a serviceDomain object represents the logical/geographical domain associated with the wireless network system. In one implementation, serviceDomain objects include a domainType field that indicates to which element a given object corresponds. That is, a serviceDomain object represents one of a campus, building, outdoor region, floor area, and the like based on the value of the domainType in the object. To support the hierarchical model discussed above (see, e.g., FIG. 2), the serviceDomain object also includes a parentDomainId that identifies the parent node of the instant node in the hierarchical model. For example, for "Campus" node, the parentDomainId is set to zero (or some other value). For a building node, the parentDomainId is set to the domainId of the campus object. For a floor area object, the parentDomainId is set to the domainId of a building object, and so on. The following sets forth, for didactic purposes, the format of a serviceDomain object according to one possible implementation of the present invention.

```
public class ServiceDomain {
    protected int domainId = 0; // Internal ID
    protected int parentDomainId = 0; // ID of parent domain
    protected String domainName = null; // Name of Campus, Building, Floor or Area
    protected int domainType = 0; // This indicates if this domain is Campus (0),
            Building (1), Floor Area . . .
    protected int unit = 1; // Unit of dimensions ft(1) or meters(2)
    protected float length = 20; // Length of domain
    protected float width = 20; // Width of domain
    protected float height = 10; // This applies for floor only
    protected float xCoordinate = 0; // This is w.r.t to parent domain's origin
    protected float yCoordinate = 0; // This is w.r.t to parent domain's origin
    protected int floorIndex = 1; // This applies for floor and floor area only
    protected int numOfBasements = 2; // This applies for building
    protected int numOfFloors = 5; // This applies for building
    protected String domainContact = null; // Contact person for this domain
    protected int rfModelId = 1; // This applies for floor area for AP Heatmap
    protected int monitorStatus = 0; // This is the status (red,green,yellow) of domain which
            is calculated based on AP status 1=critical(red),
            2=minor(yellow), 3=OK(green)
    protected String imageUrl = null; // Url of the imported image for domain. This doesn't
            apply for building
}
```

According to one implementation of the invention, the serviceDomain objects are persisted in a relational database in a table called SERVICEDOMAIN. FIG. 7 illustrates the field definitions in the SERVICEDOMAIN table according to an implementation of the present invention. In other implementations, other database types can be used to model the wireless network, such as an object-oriented database. As discussed above, wireless network management system 30 polls wireless switches 40 on a periodic basis and, based on the data gathered during the last polling operation, updates the values of one or more values in the serviceDomain objects maintained in the database. In addition, wireless network management system 30 also receives SNMP traps from access points 42 or switches 40 which may also cause updates to the database. For example, if any access point 42 within a floor area is non-operational (such as where an SNMP request times out), then wireless network management system 30 sets the monitorStatus field of the corresponding Floor ServiceDomain object to one (which, in one implementation, indicates a critical status). In addition, the monitorStatus field of the parent building serviceDomain object is also set to "critical, and so on. Furthermore, if an access point, which was non-operational, becomes operational in a subsequent polling interval, wireless network management system 30 will update the monitorStatus field of the access point and, potentially, the parent serviceDomain objects (assuming that no other access points corresponding to the parent serviceDomain objects are non-operational. In one implementation, wireless network management system 30 may also receive SNMP traps as access points fail and/or become operational, allowing wireless network management system 30 to update the database accordingly.

In one implementation, separate object types are used in wireless network management system 30 to represent the wireless switches 40, access points 42, and rogue systems. Still further, data relating to the wireless switches 40 and access points 42 are also persisted in a relational database in separate tables.

C.1.a. Access Point Back-End Data Structures

Wireless network management system 30 also includes data objects corresponding to the managed access points 42. The following illustrates the format of an access point data object, according to one implementation of the present invention. As the following illustrates, at least one RadioInterface object is associated with a corresponding access point object. The RadioInterface object contains the fields directed to a variety of performance and status data for a given radio/protocol type, such as 802.11a, or 802.11b/g. Accordingly, two RadioInterface objects are associated with an AccessPoint object for multi-mode access points.

```
public class AccessPoint {
    protected String macAddress = null;
    protected String domainKey = null;    // key of the Floor this AP is added to
    protected String domainName = null; // name of the Floor this AP is added to
    protected String apName = null;
    protected int adminStatus = 0; // If adminStatus is disabled, the AP icon is red cross
    protected int monitorOnlyMode = 0; // If this is enabled then background of label is black
    protected int operationalStatus = 1;
    protected String softwareVersion = null;
    protected String bootVersion = null;
    protected String primarySwitch = null;
    protected int reset = 0;
    protected int statsCollectionInterval = 0;
    protected int switchPort = 0;
    protected String model = null;
    protected String serialNumber = null;
    protected float xCoordinate = -1;    // position on the area map
    protected int monitorStatus = 0;    // status for critical(red),minor(yellow), OK(green)
    protected float yCoordinate = -1;    // position on the area map
    protected int dot11aClientCount = 0;
    protected int dot11bClientCount = 0;
    protected int dot11gClientCount = 0;
    protected float angle = (float)1.57; //in radians
    protected int clearConfig = 0;
    protected int mirrorMode = 0;
    protected String ipAddress = "0.0.0.0";
    protected int remoteModeSupport = 0;
    protected int apType = 0;
}
public class RadioInterface{
    protected String macAddress = null; // MAC Address of the AccessPoint this Radio belongs
                            to - foreign key reference
    protected int slotId = 0;
    protected int ifType = 0; //Whether it is 802.11a or 802.11b/g
    protected String apName = null; // Name of the AP this Radio belongs to
    protected int phyChannelAssignment = 1;
    protected int channelNumber = 0;
    protected int phyTxPowerControl = 1;
    protected int powerLevel = 0;
    protected int antennaType = 1;
    protected int antennaMode = 1;
    protected int antennaDiversity = 1;
    protected int cellSiteConfigId = 0;
    protected int numberOfWlans = 0;
    protected int operStatus = 4;
    protected int adminStatus = 1;
    protected int previousChannelNumber = 1;
    protected String lastChannelUpdateTime = null;
```

```
    protected int previousPowerLevel = 1;
    protected String lastPowerLevelUpdateTime = null;
    protected int monitorStatus = 5;
    protected int switchPort = 0;
    protected int numberOfClients = 0;
    protected int wlanOverride = 0;
    protected int antennaOptions = 0;
}
```

As discussed above, each RadioInterface object has a monitorStatus attribute which gets updated based on the results of SNMP traps and the polling operations performed by wireless network management system 30. Wireless network management system 30 determines the monitor status attribute of the AccessPoint object based on the monitorStatus attributes of each RadioInterface object to which it is associated. In one implementation, the more severe status controls. For example, if the monitorStatus of one RadioInterface object is Critical then, the monitorStatus of the AccessPoint object is also set to Critical. As discussed above, the Critical status propagates to the monitorStatus value of the higher level data objects (e.g., Floor, Building, and Campus). In other words, the status accorded to any given data object depends on the most severe status of all leaf nodes that depend directly or indirectly from the instant data object.

C.2. Front End Data Structures

To implement the graphical user interfaces described above, Javascript or other user-interface rendering languages are used to create code that is embedded in HTML pages. In one implementation, Javascript or other user interface rendering languages can be used. In one implementation, wireless network management system 30 includes an interface rendering module 37 that gathers data from the back end database 44 discussed above, and constructs a code object (such as a Javascript object), that is embedded in an HTML page and transmitted to, for example, client computer 60. As with the back end systems, the rendering module 37 and embedded code objects incorporate various object types corresponding to the Campus, Building, Floor Area and other geographical elements discussed above.

In the front end aspects of the wireless network management system 30, there are separate object types for each of the back-end serviceDomain object types. The following sets forth the format of the object types implemented by the rendering engine of wireless network management system 30, according to one embodiment of the present invention.

```
/* Object that represents Campus */
function CampusMap(id,name,contact,imageUrl,width,height){
this.id = id;
this.imageUrl = imageUrl;
this.width = width;
this.height = height;
this.name = name;
this.contact = contact;
this.status = 0; // This is mapped to monitorStatus of ServiceDomain
this.unitStr = "";
}
/* Object that represents Building */
function BuildingInfo(id,name,contact,key,x,y,width,height){
this.id = id;
this.name = name;
this.contact = contact;
this.key = key;
this.x = x;
this.y = y;
this.width = width;
this.height = height;
this.floors = 0;
this.basements = 0;
this.status = 0; // This is mapped to monitorStatus of ServiceDomain
}
/* Object that represents Outdoor Area */
function OutdoorAreaInfo(id,name,contact,key,imageUrl,x,y,width,height){
this.id = id;
this.name = name;
this.contact = contact;
this.key = key;
this.imageUrl = imageUrl;
this.x = x;
this.y = y;
this.width = width;
this.height = height;
this.status = 0; // This is mapped to monitorStatus of ServiceDomain
this.details = detail__OutdoorAreaInfo;
}
/* Object that represents Floor Area */
function FloorArea(id,name,contact,key,imageUrl,x,y,width,height,floorIndex){
this.id = id;
this.name = name;
this.contact = contact;
this.key = key;
this.imageUrl = imageUrl;
this.x = x;
this.y = y;
this.width = width;
this.height = height;
this.floorIndex = floorIndex;
this.status = 0; // This is mapped to monitorStatus of ServiceDomain
}
/* Object that represents Access Point */
function AccessPoint(id,x,y,macAddr,name){
this.id = id;
this.x = x;
this.y = y;
this.macAddr = macAddr;
this.name = name;
this.angle = 0;
this.location = "";
this.monitorOnlyMode = 0;
this.switchPort = 0;
this.switchKey = "";
this.adminStatus = 0;
this.primarySwitch = "";
this.hardwareVersion = "";
this.softwareVersion = "";
this.bootVersion = "";
this.statsInterval = 0;
this.cardId = "";
this.cardRevision = "";
this.model = "";
this.serialNumber = "";
this.overallStatus = "";
this.isDetectedAsRogue = false;
this.dot11aRadio = null; // This is reference to 802.11a object i.e. dot11Radio
this.dot11bRadio = null; // This is reference to 802.11b object i.e. dot11Radio
}
```

-continued

```
function dot11Radio(ifType){
this.id = "";
this.ifType = ifType; // This is either 802.11a or 802.11b/g
this.chNo = 0;
this.chAssignment = 0;
this.powerLevel = 0;
this.powerAssignment = 0;
this.antennaType = 0;
this.antennaMode = 0;
this.antennaDiversity = 0;
this.numberOfWlans = 0;
this.operStatus = 0;
this.adminStatus = 0;
this.dot11AdminStatus = 0;
this.status = 0;
this.switchPort = 0;
this.isReachable = 0;
this.isAssociated = 0;
// load parameters
this.userCount = 0;
this.rxUtilization = 0;
this.txUtilization = 0;
this.channelUtilization = 0;
this.totalUtilization = totalUtilization;
this.numberOfPoorClients = 0;
// profile parameters
this.loadProfileState = 0;
this.interferenceProfileState = 0;
this.noiseProfileState = 0;
this.coverageProfileState = 0;
}
```

In one embodiment, wireless network management system 30 includes the rogue detection functionality disclosed in U.S. application Ser. No. 407,370. In the embodiment shown, wireless network management system 30 is operative to detect a rogue access point, compute its estimate location, and create a front end AccessPoint object, setting the this.isDetectedAsRogue Boolean to true and the this.status variable to a critical value. The detected rogue can then be presented in a floor view or area map interface similar to managed access points.

The invention has been explained with reference to specific embodiments. For example, while embodiments of the present invention have been described as operating in connection with IEEE 802.11 networks, the present invention can be used in connection with any WLAN environment. In addition, while the embodiments described above use SNMP to exchange data, other protocols can be used, such as XML, SOAP, TML1, and the like. Other embodiments will be evident to those of ordinary skill in the art. It is therefore not intended that the invention be limited except as indicated by the appended claims.

What is claimed is:

1. A method comprising
gathering wireless network status information from a plurality of wireless access points;
maintaining, in a database, a network model data structure, said network model data structure including the wireless network status information, wherein the network model data structure comprises a map of a physical region and location information identifying locations of the plurality of wireless access points within the physical region;
constructing a graphical user interface showing status information for one or more of the plurality of wireless access points, wherein the graphical user interface comprises at least a portion of the map of the physical region and a graphical boundary overlaid on the map defining a sub-region of the physical region; and
identifying, based on the location information of the hierarchical network data model, one or more of the plurality of wireless access points within the sub-region defined by the graphical boundary;
accessing the wireless network status information in the database to determine a status associated with the identified wireless access points; and
modulating an attribute of the graphical boundary to indicate the status of one or more of the identified wireless access points located within the sub-region defined by the graphical boundary.

2. The method of claim 1 wherein modulating the attribute of the graphical boundary, comprises selecting an attribute state from a plurality of predefined attribute states.

3. The method of claim 1 wherein the attribute is a color of the graphical boundary.

4. The method of claim 1 wherein the attribute is a line style of the graphical boundary.

5. The method of claim 1 wherein modulating the attribute of the graphical boundary comprises identifying a most critical status among the identified wireless access points and using the most critical status in modulating the attribute of the graphical boundary.

6. A method comprising
gathering wireless network status information from a plurality of wireless access points;
storing, in a memory, a hierarchical network model data structure, said hierarchical network model data structure including the wireless network status information, wherein the hierarchical network model data comprises a map of a network environment;
a graphical boundary encompassing a region within the map;
a campus node corresponding to a geographic region;
a building node, wherein the building node is a child of the campus node; and
a floor node, wherein the floor node is a child of the building node, and wherein the floor node contains an area map, wherein the area map is associated with an image depicting a physical area within the geographic region, and includes information specifying the location of at least one access point within the physical location;
retrieving the wireless network status information from the memory; and
presenting a graphical user interface comprising the map of the network environment and the graphical boundary; and
modulating an attribute of the graphical boundary to indicate status of one or more access points located within the region encompassed by the graphical boundary.

7. The method of claim 6 wherein the campus node is associated with an image data file containing an image of the map of the network environment.

8. The method of claim 7 wherein the building node includes coordinate data describing the location and extent of a bounded region within the image of the geographic region corresponding to the campus node.

9. The method of claim 6 wherein the hierarchical network model is implemented in a relational database.

10. The method of claim 6 wherein modulating the attribute of the graphical boundary, comprises selecting an attribute state from a plurality of predefined attribute states.

11. The method of claim 6 wherein the attribute is a color of the graphical boundary.

12. The method of claim 11 wherein the attribute state is a color selected from the group including red, yellow and green.

13. The method of claim 6 wherein the attribute is a line style of the graphical boundary.

14. The method of claim 6 wherein the status is the most critical status among the one or more access points within the region encompassed by the physical boundary.

15. The method of claim 6 wherein the status is selected from one of a plurality of predefined status types.

16. The method of claim 15 wherein the plurality of predefined status types are critical, minor, and no fault.

17. The method of claim 6 wherein modulating the attribute of the graphical boundary comprises identifying a most critical status among the identifies wireless access points and using the most critical status in modulating the attribute of the graphical boundary.

18. A wireless network management system for monitoring a plurality of access points within a wireless network, comprising
   a database comprising
      one or more building objects, each comprising a building status attribute, region parameters defining the location and extent of a region within a campus, and an identifier to a parent campus object;
      one or more access point objects, each of the access point objects associated with a building object of the one or more building objects and comprising a status attribute, location coordinates; and
      a campus object comprising the one or more building objects, a campus status attribute, and a campus map of a network environment;
   a data gathering engine operative to
      gather information from the plurality of access points;
      depending on the gathered information, update the value of the corresponding status attributes for the access points in the database;
      update, based on the status attributes, the value of the building status attributes corresponding to the respective access points objects; and
   a network management application operative to
      present a graphical user interface comprising
         the campus map of the network environment;
         a graphical boundary encompassing a region within the map of the network environment, the location and extent of the graphical boundary within the campus map defined by the region parameters of the building object, wherein the building status attribute of the building object controls the state of a physically observable attribute of the graphical boundary.

19. The wireless network management system of claim 18 wherein the database further comprises one or more floor level objects, each comprising a floor level status attribute, an area map, and an identifier to a parent building object, wherein the data gathering engine is further operative to update, based on the status attributes, the value of the floor level status attributes corresponding to the respective parent floor level objects of the access points; and update, based on the floor level status attributes, the value of the building status attributes corresponding to the respective parent building objects of the floor level objects; and wherein the network management application is further operative to
   present a second graphical user interface comprising
      the area map of a selected floor level object of the one or more floor level objects; and
      an access point status icon associated with the selected floor level object, wherein the state of the access point status icon corresponds to the status attribute of the corresponding access point object.

20. The wireless network management system of claim 19 wherein the location of the access point status icon within the area map is based on the location coordinates of the corresponding access point object.

21. The wireless network management system of claim 19 wherein the network management application selects a state for the access point status icon from a plurality of predefined states based on the status attribute of the corresponding access point object.

22. The wireless network management system of claim 21 wherein the state is a color of the access point status icon.

23. The wireless network management system of claim 22 wherein the attribute state is a color selected from the group including red, yellow and green.

* * * * *